(12) United States Patent
Pratt, Jr. et al.

(10) Patent No.: US 8,356,431 B2
(45) Date of Patent: Jan. 22, 2013

(54) SCHEDULING COMMUNICATION FRAMES IN A WIRELESS NETWORK

(75) Inventors: Wallace A. Pratt, Jr., Pflugerville, TX (US); Mark J. Nixon, Round Rock, TX (US); Eric D. Rotvold, West St. Paul, MN (US); Robin S. Pramanik, Karlsruhe (DE); Tomas P. Lennvall, Vasteras (SE); Yuri Zats, Menlo Park, CA (US); Terrence L. Blevins, Round Rock, TX (US)

(73) Assignee: Hart Communication Foundation, Austin, TX (US)

( * ) Notice: Subject to any disclaimer, the term of this patent is extended or adjusted under 35 U.S.C. 154(b) by 1100 days.

(21) Appl. No.: 12/101,074

(22) Filed: Apr. 10, 2008

(65) Prior Publication Data

US 2009/0046675 A1    Feb. 19, 2009

Related U.S. Application Data

(60) Provisional application No. 60/911,795, filed on Apr. 13, 2007.

(51) Int. Cl.
 *H04J 3/00* (2006.01)
(52) U.S. Cl. ............................ 37/337; 370/512; 709/232
(58) Field of Classification Search .................... 370/337
 See application file for complete search history.

(56) References Cited

U.S. PATENT DOCUMENTS

| 4,792,944 A | 12/1988 | Takahashi et al. |
| 5,159,592 A | 10/1992 | Perkins |
| 5,719,859 A | 2/1998 | Kobayashi et al. |
| 5,926,531 A | 7/1999 | Petite |
| 6,028,522 A | 2/2000 | Petite |
| 6,198,751 B1 | 3/2001 | Dorsey et al. |
| 6,218,953 B1 | 4/2001 | Petite |
| 6,233,327 B1 | 5/2001 | Petite |
| 6,236,334 B1 | 5/2001 | Tapperson et al. |

(Continued)

FOREIGN PATENT DOCUMENTS

CA    2324563 A1    9/1999

(Continued)

OTHER PUBLICATIONS

International Preliminary Report on Patentability from corresponding International Application No. PCT/US08/04761 (Oct. 13, 2009).

(Continued)

*Primary Examiner* — Mark Rinehart
*Assistant Examiner* — Matthew Hopkins
(74) *Attorney, Agent, or Firm* — Marshall, Gerstein & Borun LLP

(57) ABSTRACT

A method of scheduling communications in a multi-node wireless mesh network which has a first network device and a second network device includes defining a communication timeslot of a predetermined duration, defining a first superframe having a repeating superframe cycle including a first number of the communication timeslots, defining a second superframe having a repeating superframe cycle including a second number of the communication timeslots, aligning the first superframe with the second superframe, so that one of the timeslots of the first superframe begins simultaneously with one of the timeslots of the second superframe, and associating the first and the second superframes with a network schedule, so that the first network device and the second network device transmit data according to the network schedule.

27 Claims, 8 Drawing Sheets

U.S. PATENT DOCUMENTS

| | | |
|---|---|---|
| 6,298,377 B1 | 10/2001 | Hartikainen et al. |
| 6,430,268 B1 | 8/2002 | Petite |
| 6,437,692 B1 | 8/2002 | Petite et al. |
| 6,522,974 B2 | 2/2003 | Sitton |
| 6,578,047 B1 | 6/2003 | Deguchi |
| 6,594,530 B1 | 7/2003 | Glanzer et al. |
| 6,618,578 B1 | 9/2003 | Petite |
| 6,628,764 B1 | 9/2003 | Petite |
| 6,747,557 B1 | 6/2004 | Petite et al. |
| 6,801,777 B2 | 10/2004 | Rusch |
| 6,836,737 B2 | 12/2004 | Petite et al. |
| 6,891,838 B1 | 5/2005 | Petite et al. |
| 6,914,533 B2 | 7/2005 | Petite |
| 6,914,893 B2 | 7/2005 | Petite |
| 6,920,171 B2 | 7/2005 | Souissi et al. |
| 6,959,356 B2 | 10/2005 | Packwood et al. |
| 6,970,909 B2 | 11/2005 | Schulzrinne |
| 6,996,100 B1 | 2/2006 | Haartsen |
| 7,002,958 B1 | 2/2006 | Basturk et al. |
| 7,053,767 B2 | 5/2006 | Petite et al. |
| 7,079,810 B2 | 7/2006 | Petite et al. |
| 7,103,511 B2 | 9/2006 | Petite |
| 7,110,380 B2* | 9/2006 | Shvodian ............... 370/336 |
| 7,137,550 B1 | 11/2006 | Petite |
| 7,209,840 B2 | 4/2007 | Petite et al. |
| 7,263,073 B2 | 8/2007 | Petite et al. |
| 7,292,246 B2 | 11/2007 | Goldschmidt |
| 7,295,128 B2 | 11/2007 | Petite |
| 7,346,463 B2 | 3/2008 | Petite et al. |
| 7,375,594 B1 | 5/2008 | Lemkin et al. |
| 7,397,907 B2 | 7/2008 | Petite |
| 7,420,980 B1 | 9/2008 | Pister et al. |
| 7,468,661 B2 | 12/2008 | Petite et al. |
| 7,529,217 B2 | 5/2009 | Pister et al. |
| 7,602,741 B2 | 10/2009 | Tapperson et al. |
| 7,650,425 B2 | 1/2010 | Davis et al. |
| 7,675,935 B2 | 3/2010 | Samudrala et al. |
| 7,680,033 B1 | 3/2010 | Khan et al. |
| 7,697,492 B2 | 4/2010 | Petite |
| 7,848,827 B2 | 12/2010 | Chen |
| 7,853,221 B2 | 12/2010 | Rodriguez et al. |
| 7,978,059 B2 | 7/2011 | Petite et al. |
| 8,013,732 B2 | 9/2011 | Petite et al. |
| 8,064,412 B2 | 11/2011 | Petite |
| 2001/0030957 A1 | 10/2001 | McCann et al. |
| 2001/0041591 A1 | 11/2001 | Carroll |
| 2002/0007414 A1 | 1/2002 | Inoue et al. |
| 2002/0013679 A1 | 1/2002 | Petite |
| 2002/0031101 A1 | 3/2002 | Petite et al. |
| 2002/0067693 A1 | 6/2002 | Kodialam et al. |
| 2002/0111169 A1 | 8/2002 | Vanghi |
| 2002/0120671 A1 | 8/2002 | Daffner et al. |
| 2003/0014535 A1 | 1/2003 | Mora |
| 2003/0026268 A1 | 2/2003 | Navas |
| 2003/0040897 A1 | 2/2003 | Murphy et al. |
| 2003/0074489 A1 | 4/2003 | Steger et al. |
| 2003/0169722 A1 | 9/2003 | Petrus et al. |
| 2003/0198220 A1 | 10/2003 | Gross et al. |
| 2003/0236579 A1 | 12/2003 | Hauhia et al. |
| 2004/0011716 A1 | 1/2004 | Sandt et al. |
| 2004/0028023 A1 | 2/2004 | Mandhyan et al. |
| 2004/0053600 A1 | 3/2004 | Chow et al. |
| 2004/0095951 A1 | 5/2004 | Park |
| 2004/0117497 A1* | 6/2004 | Park .............................. 709/230 |
| 2004/0148135 A1 | 7/2004 | Balakrishnan et al. |
| 2004/0174904 A1 | 9/2004 | Kim et al. |
| 2004/0183687 A1 | 9/2004 | Petite et al. |
| 2004/0203973 A1 | 10/2004 | Khan |
| 2004/0257995 A1 | 12/2004 | Sandy et al. |
| 2004/0259533 A1 | 12/2004 | Nixon et al. |
| 2005/0013253 A1 | 1/2005 | Lindskog et al. |
| 2005/0018643 A1 | 1/2005 | Neilson et al. |
| 2005/0025129 A1 | 2/2005 | Meier |
| 2005/0030968 A1 | 2/2005 | Rich et al. |
| 2005/0049727 A1 | 3/2005 | Tapperson et al. |
| 2005/0078672 A1 | 4/2005 | Caliskan et al. |
| 2005/0085928 A1 | 4/2005 | Shani |
| 2005/0114517 A1 | 5/2005 | Maffeis |
| 2005/0125085 A1 | 6/2005 | Prasad et al. |
| 2005/0160138 A1 | 7/2005 | Ishidoshiro |
| 2005/0164684 A1 | 7/2005 | Chen et al. |
| 2005/0190712 A1 | 9/2005 | Lee et al. |
| 2005/0192037 A1 | 9/2005 | Nanda et al. |
| 2005/0213612 A1 | 9/2005 | Pister et al. |
| 2005/0213621 A1* | 9/2005 | Varga et al. ................ 372/38.02 |
| 2005/0228509 A1 | 10/2005 | James |
| 2005/0239413 A1 | 10/2005 | Wiberg et al. |
| 2005/0249137 A1* | 11/2005 | Todd et al. ..................... 370/311 |
| 2005/0276233 A1 | 12/2005 | Shepard et al. |
| 2005/0282494 A1 | 12/2005 | Kossi et al. |
| 2006/0007927 A1 | 1/2006 | Lee et al. |
| 2006/0029060 A1 | 2/2006 | Pister |
| 2006/0029061 A1 | 2/2006 | Pister et al. |
| 2006/0045016 A1 | 3/2006 | Dawdy et al. |
| 2006/0062192 A1 | 3/2006 | Payne |
| 2006/0067280 A1 | 3/2006 | Howard et al. |
| 2006/0077917 A1 | 4/2006 | Brahmajosyula et al. |
| 2006/0120384 A1 | 6/2006 | Boutboul et al. |
| 2006/0174017 A1 | 8/2006 | Robertson |
| 2006/0182076 A1 | 8/2006 | Wang |
| 2006/0192671 A1 | 8/2006 | Isenmann et al. |
| 2006/0213612 A1 | 9/2006 | Perron et al. |
| 2006/0215582 A1 | 9/2006 | Castagnoli et al. |
| 2006/0245440 A1 | 11/2006 | Mizukoshi |
| 2006/0253584 A1 | 11/2006 | Dixon et al. |
| 2007/0016724 A1 | 1/2007 | Gaither et al. |
| 2007/0070943 A1 | 3/2007 | Livet et al. |
| 2007/0074489 A1 | 4/2007 | Erhardt et al. |
| 2007/0076600 A1 | 4/2007 | Ekl et al. |
| 2007/0078995 A1 | 4/2007 | Benard et al. |
| 2007/0109592 A1 | 5/2007 | Parvathaneni et al. |
| 2007/0118604 A1 | 5/2007 | Costa Requena |
| 2007/0121531 A1 | 5/2007 | Lee et al. |
| 2007/0140245 A1 | 6/2007 | Anjum et al. |
| 2007/0143392 A1 | 6/2007 | Choe et al. |
| 2007/0161371 A1 | 7/2007 | Dobrowski et al. |
| 2007/0237094 A1 | 10/2007 | Bi et al. |
| 2007/0243879 A1 | 10/2007 | Park et al. |
| 2007/0280144 A1 | 12/2007 | Hodson et al. |
| 2007/0280286 A1 | 12/2007 | Hodson et al. |
| 2007/0282463 A1 | 12/2007 | Hodson et al. |
| 2007/0283030 A1 | 12/2007 | Deininger et al. |
| 2008/0075007 A1 | 3/2008 | Mehta et al. |
| 2008/0082636 A1 | 4/2008 | Hofmann et al. |
| 2008/0084852 A1 | 4/2008 | Karschnia |
| 2008/0098226 A1 | 4/2008 | Zokumasui |
| 2008/0117836 A1 | 5/2008 | Savoor et al. |
| 2008/0120676 A1 | 5/2008 | Morad et al. |
| 2008/0148296 A1* | 6/2008 | Chen et al. ..................... 719/328 |
| 2008/0192812 A1 | 8/2008 | Naeve et al. |
| 2008/0198860 A1 | 8/2008 | Jain et al. |
| 2008/0215773 A1 | 9/2008 | Christison et al. |
| 2008/0285582 A1 | 11/2008 | Pister et al. |
| 2009/0059855 A1* | 3/2009 | Nanda et al. ................... 370/329 |
| 2009/0068947 A1 | 3/2009 | Petite |
| 2009/0097502 A1 | 4/2009 | Yamamoto |
| 2009/0154481 A1 | 6/2009 | Han et al. |
| 2010/0194582 A1 | 8/2010 | Petite |
| 2010/0312881 A1 | 12/2010 | Davis et al. |
| 2011/0264324 A1 | 10/2011 | Petite et al. |
| 2011/0309953 A1 | 12/2011 | Petite et al. |
| 2011/0320050 A1 | 12/2011 | Petite et al. |

FOREIGN PATENT DOCUMENTS

| | | |
|---|---|---|
| CN | 1170464 A | 1/1998 |
| CN | 1804744 A | 7/2006 |
| EP | 1169690 A2 | 1/2002 |
| EP | 1236075 A2 | 9/2002 |
| EP | 1293853 A1 | 3/2003 |
| EP | 1370958 A1 | 12/2003 |
| EP | 1376939 A2 | 1/2004 |
| EP | 2388708 A1 | 11/2011 |
| GB | 2 403 043 A | 12/2004 |
| JP | 2005143001 | 6/2005 |
| KR | 1020010076781 | 8/2001 |
| KR | 1020040048245 | 6/2004 |
| KR | 1020050028737 | 3/2005 |

| KR | 1020060066580 | 6/2006 |
| KR | 1020050016891 | 9/2006 |
| KR | 1020060111318 | 10/2006 |
| KR | 1020070026600 | 3/2007 |
| WO | WO-00/55825 A1 | 9/2000 |
| WO | WO-01/35190 A2 | 5/2001 |
| WO | WO-02/05199 A1 | 1/2002 |
| WO | WO-02/13036 A1 | 2/2002 |
| WO | WO-02/13412 A1 | 2/2002 |
| WO | WO-02/13413 A1 | 2/2002 |
| WO | WO-02/13414 A1 | 2/2002 |
| WO | WO-02/075565 A1 | 9/2002 |
| WO | WO-2005079026 A1 | 8/2005 |
| WO | WO-2005/096722 A2 | 10/2005 |
| WO | WO-2006121114 A1 | 11/2006 |

OTHER PUBLICATIONS

International Search Report and Written Opinion for corresponding International Application No. PCT/US08/04761 (Aug. 14, 2008).

Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.

Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.

Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.

Kastner et al., "Communication Systems for Building Automation and Control," Proceedings of the IEEE, vol. 93, No. 6, Jun. 1, 2005, pp. 1178-1203.

Thomesse, J., "Fieldbus Technology in Industrial Automation," Proceedings of the IEEE, vol. 93, No. 6, Jun. 1, 2005, pp. 1073-1101.

Cleveland, F., "IEC TC57 Security Standards for the Power System's Information Infrastructure—Beyond Simple Encryption," May 21, 2006, pp. 1079-1087.

Matkurbanov et al., "A Survey and Analysis of Wireless Fieldbus for Industrial Environments," SICE-ICCAS 2006 International Joint Conference, 5555-5561 (2006).

Lopez et al., "Wireless communications deployment in industry: a review of issues, options and technologies," Computers in Industry, Elsevier Science, 56:29-53 (2005).

Shen et al., "Wireless Sensor Networks for Industrial Applications," WCICA, 15-19 (2004).

"A Survey and Analysis of Wireless Field bus for Industrial Environments", Pulat Matkurbanov, SeungKi Lee, Dong-Sung Kim; Dept. of Electron. Eng., Kumoh Nat. Inst. Of Technol., Gumi. This paper appears in: SICE-ICASE, 2006. International Joint Conference: Issue Date: Oct. 18-21, 2006, on pp. 55555-55561; Print ISBN: 89-950038-4-7.

"D1100 SmartMesh Network Release 1.0 Engineering Software Specifications," Dust Networks, Dec. 17, 2011, 36 pages.

"D1100 SmartMesh Network Release 1.0 Engineering Software Specifications," Dust Networks, 36 pages.

"Multiple Interpenetrating MultiDiGraphs," Dust Incorporated, 12 pages. (Powerpoint).

"SmartMesh-XT CLI Commands Guide," Dust Networks, Inc., Jun. 27, 2007, 36 pages.

SmartMesh-XT KT1030/KT2135/KT2030 Evaluation Kit Guide, Dust Networks, Inc., Nov. 2, 2007, 58 pages.

"SmartMesh-XT M2135-2, M2030-2 2.4 GHz Wireless Analog/Digital/Serial Motes," Dust Networks, Inc., Mar. 28, 2007, 33 pages.

SmartMesh-XT Manager XML API Guide, Dust Networks, Inc., Apr. 4, 2007, 148 pages.

"System Description for Security Review SmartMesh Alba," Dust Networks, 36 pages.

Berlemann, Software Defined Protocols Based on Generic Protocol Functions for Wired and Wireless Networks, Nov, 2033, RWTH Aachen University.

Qu et al., "A web-enabled distributed control application platform for industrial automation", Emerging Technologies and Factory Automation, Proceedings, 2:129-32 (Sep. 16, 2003).

Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).

Zheng, "ZigBee wireless sensor network in industrial applications", SICE-ICCAS 2006 International Joint Conference, IEEE, New Jersey, pp. 1067-1070 (Oct. 1, 2006).

Deering et al., "Internet Protocol, Version 6 (IPv6) Specification; rfc1883.txt", IETF Standard, Internet Engineering Task Force, IETF, CH, Dec. 1, 1995, XP015007667.

* cited by examiner

SCHEDULING COMMUNICATION FRAMES IN A WIRELESS NETWORK

CROSS-REFERENCE TO RELATED APPLICATIONS

This application claims benefit of the U.S. Provisional Application No. 60/911,795, entitled "Routing, Scheduling, Reliable and Secure Operations in a Wireless Communication Protocol" filed Apr. 13, 2007, the disclosure of which is hereby expressly incorporated herein by reference.

FIELD OF TECHNOLOGY

The present invention relates generally to wireless communications and, more particularly, to scheduling communication frames in a wireless network.

BACKGROUND

It is known to use standardized communication protocols in the process control industry to enable devices made by different manufacturers to communicate with one another in an easy to use and implement manner. One such well known communication standard used in the process control industry is the Highway Addressable Remote Transmitter (HART) Communication Foundation protocol, referred to generally as the HART protocol. Generally speaking, the HART protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

There has been a move, in the past number of years, to incorporate wireless technology into various industries including, in some limited manner, the process control industry. However, there are significant hurdles in the process control industry that limit the full scale incorporation, acceptance and use of wireless technology. In particular, the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236,334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

One factor significantly inhibiting the development and application of wireless communications in the process control industry is the difficulty of retrofitting legacy devices for the use with wireless communication networks. In some cases, devices cannot be retrofitted at all and need to be replaced with newer, wireless-ready models. Moreover, many of the supporting installations are similarly rendered obsolete by a transition to wireless communications. In other words, wireless networks cannot easily extend wired networks. An additional challenge particularly pertinent to the process control industry is the high cost of the existing wired installations and the understandable reluctance of the operators to completely replace the wired infrastructure with a wireless infrastructure. Meanwhile, wireless networks typically require stationary antennas or access points to transmit and receive radio signals and may therefore require an expensive infrastructure which makes the transition to wireless communications less desirable. Thus, while some operators may recognize the advantages of a wireless approach to process measurement and control, many may be unwilling to dismantle the existing installations, decommission the wired devices which may be fully operational, and purchase wireless devices.

Another factor contributing to the slower than expected proliferation of wireless standards in the process control industry is the impact on a user, such as a technician or an operator of a process control system. During operation of a typical process control system, users may remotely access individual devices for the purposes of configuring, monitoring, and controlling various functions of the devices. For example, to enable access and exchange of information over the HART protocol, devices are assigned unique addresses according to a predefined addressing scheme. Users and the software applications developed for operators and technicians in the process control industry have come to rely on an efficient addressing scheme which cannot be supported by the available wireless standards. Thus, a transition to a wireless standard in a process control industry is widely expected to entail adopting a new addressing scheme, updating the corresponding software applications and providing additional training to the personnel.

Additionally, some of the existing wireless standards, such as the IEEE 802.11(x) WLAN, for example, do not satisfy all of the demands of the process control industry. For example, devices communicate both process and control data which may typically have different propagation delay constraints. In general, some of the critical data exchanged in the process control industry may require efficient, reliable and timely delivery which cannot always be guaranteed by the existing wireless protocols. Moreover, because some of the modules used in the process control industry are used to control very sensitive and potentially dangerous process activities, wireless standards suitable for this industry need to provide redundancy in communication paths not readily available in the known wireless networks. Finally, some process control devices may be sensitive to high power radio signals and may require radio transmissions to be limited or held at a well controlled power level. Meanwhile, the available wireless standards typically rely on antennas or access points which transmit relatively strong signals to cover large geographic areas.

Similar to wired communication protocols, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. To complicate matters, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In the process control industry, developers of wireless communication protocols face additional challenges, such as achieving backward compatibility with wired devices, supporting previous wired versions of a protocol, providing transition services to devices retrofitted with wireless communicators, and providing routing techniques which can ensure both reliability and efficiency. Meanwhile, there remains a wide number of process control applications in which there are few, if any, in-place measurements. Currently these applications rely on observed measurements (e.g. water level is rising) or inspection (e.g. period maintenance of air conditioning unit, pump, fan, etc.) to discover abnormal situations. In order to take action, operators frequently require face-to-face discussions. Many of these applications could be greatly simplified if measurement and control devices were utilized. However, current measurement devices usually require power, communications infrastructure, configuration, and support infrastructure which simply is not available.

In yet another aspect, the process control industry requires that the communication protocol servicing a particular process control network be able to accommodate field devices with different data transmission requirements, priorities, and power capabilities. In particular, some process control systems may include measurement devices that frequently (such as several times per second) report measurements to a centralized controller or to another field device. Meanwhile, another device in the same system may report measurements, alarms, or other data only once per hour. However, both devices may require that the respective measurement reports propagate to a destination host, such as a controller, a workstation, or a peer field device, with as little overhead in time and bandwidth as possible.

SUMMARY

A wireless mesh network for use in, for example, process control plants includes a plurality of network devices communicating according to a network schedule defined as a set of concurrent overlapping superframes. Each of the superframes includes several communication timeslots of a predetermined time duration and each superframe repeats immediately after the occurrence of all communication timeslots in the superframe. Generally speaking, the total number of timeslots in each superframe defines the length of the superframe and each particular timeslot has a relative timeslot number that corresponds to the number of timeslots existing in the superframe prior to the particular timeslot. In one embodiment, each timeslot includes a transmission time segment during which one or more network devices transmit data and an acknowledgement segment during which one or more network devices send an acknowledgement corresponding to the transmitted data. In some embodiments, a network device further performs Clear Channel Assessment to ascertain whether a particular shared timeslot is available for transmission.

The length of each superframe may correspond to a transmission requirement of a particular network device. In this case, a dedicated service defines superframes and allocates timeslots within each of the superframes according to the needs of network devices and of external hosts communicating with the network devices. In one embodiment, the dedicated service associates a network device with one or more timeslots of a particular superframe so that the network device may transmit or receive data during each occurrence of the timeslot. If desired, a network device may participate in multiple superframes to transmit data specific to the network device and to forward data between other network devices.

If desired, the dedicated service may dynamically create and destroy superframes in view of changes in network conditions such as data bursts, congestion, block transfers, and network devices entering or leaving the network. Moreover, a network device or the dedicated service may efficiently deactivate a superframe without destroying the superframe by issuing a particular command. If desired, the dedicated service may be a software entity running on a dedicated physical host, or the dedicated service may run on a gateway device connecting the wireless mesh network to an external network or host.

The network schedule may include multiple communication channels and, in some embodiments, each communication channel may correspond to a unique carrier radio frequency. Each network device may have an individual schedule that includes relative timeslot numbers and communication channel identifiers and the individual schedule may specify the individually scheduled timeslots that the network device uses to transmit process data, route data originated from another network device, receive device-specific data, or receive broadcast data. In some embodiments, the individual schedule for a network device may specify a timeslot associated with several distinct communication channels during different superframe cycles, so that the network device transmits or receives data over different communication channels within a timeslot having the same relative slot number of a particular superframe. In some of these embodiments, the network device, in accordance with a corresponding individual schedule, iterates through several channels associated with a particular timeslot in a predefined manner. In other embodiments, the network schedule does not allocate different communication channels to the same timeslot.

If desired, the dedicated service may create long superframes for a transient device that periodically wakes up according to a predefined schedule, thereby eliminating the need for the transient device to negotiate resources for each transmission session. In yet another embodiment, the transient device conserves power by transmitting data only according to the necessary update rate of the transient device.

In a still further embodiment, at least some of the network devices are field devices performing a measurement or control functions in a process control environment. Each of these field devices is provisioned with a particular update rate, or frequency of communicating process data to another network device. In this case, the dedicated service defines superframes according to the update rates of the field devices. Moreover, if desired, a field device can negotiate a temporary change in timeslot allocation due to an occurrence of a transient condition requiring a higher-than-normal or lower-than-normal bandwidth.

DETAILED DESCRIPTION OF THE DRAWINGS

Figure 5:
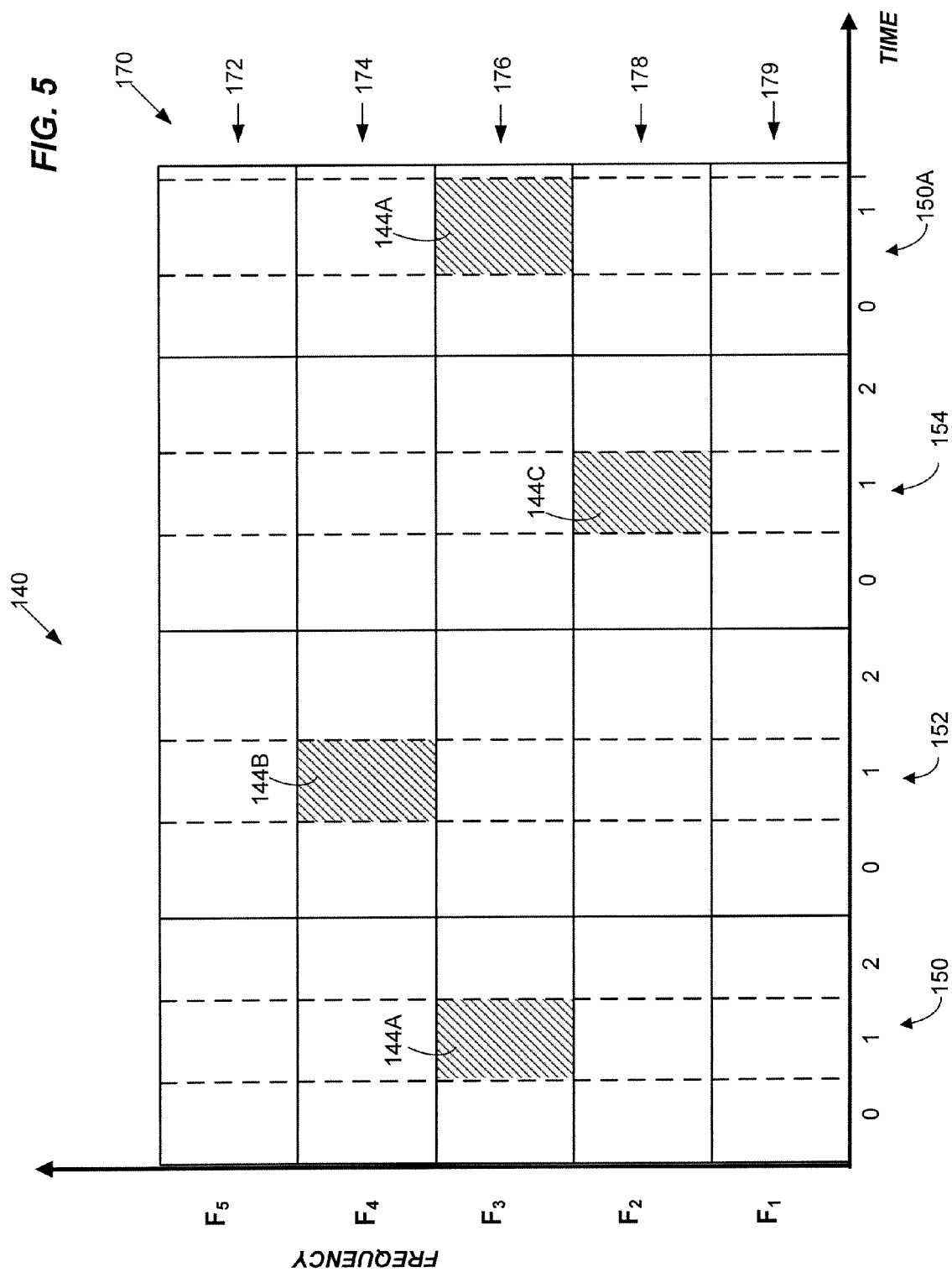

FIG. 5 schematically illustrates association of a timeslot of an exemplary superframe with several communication channels.

Figure 6:
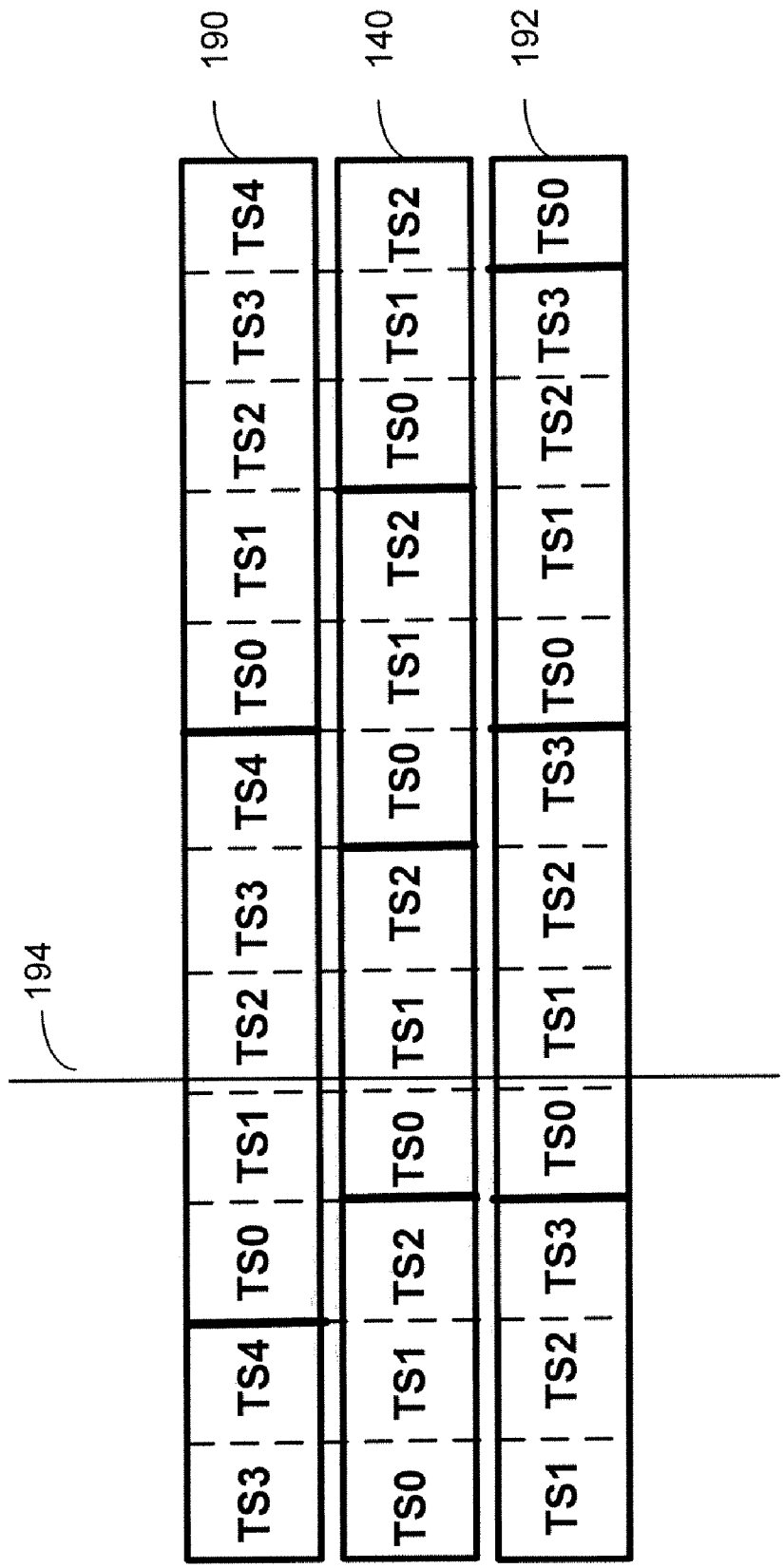

FIG. 6 is a block diagram that schematically illustrates an exemplary superframe definition including several concurrent superframes of different length.

Figure 7:
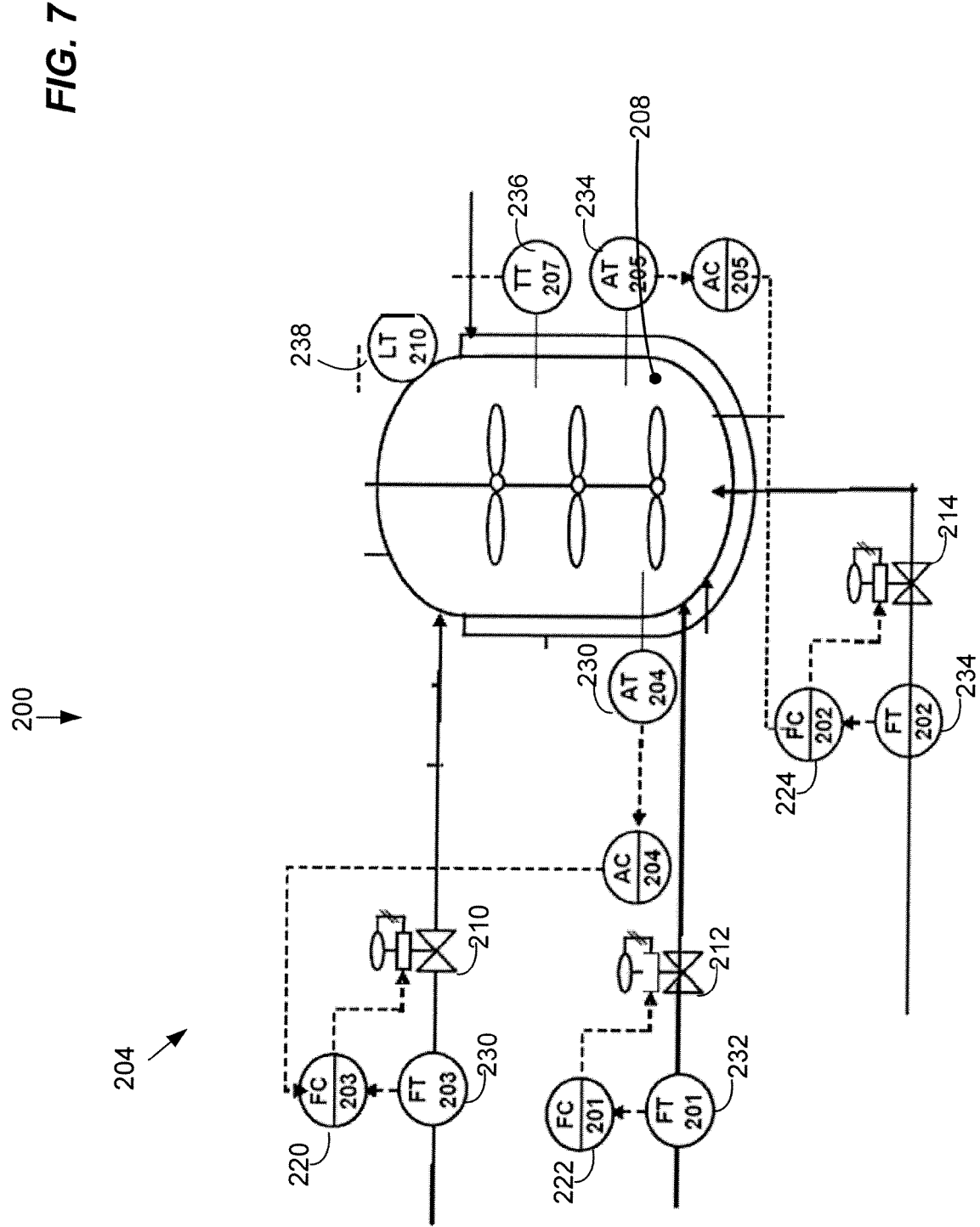

FIG. 7 illustrates an exemplary system in which several devices participate in a wireless network utilizing the scheduling techniques discussed herein.

Figure 8:
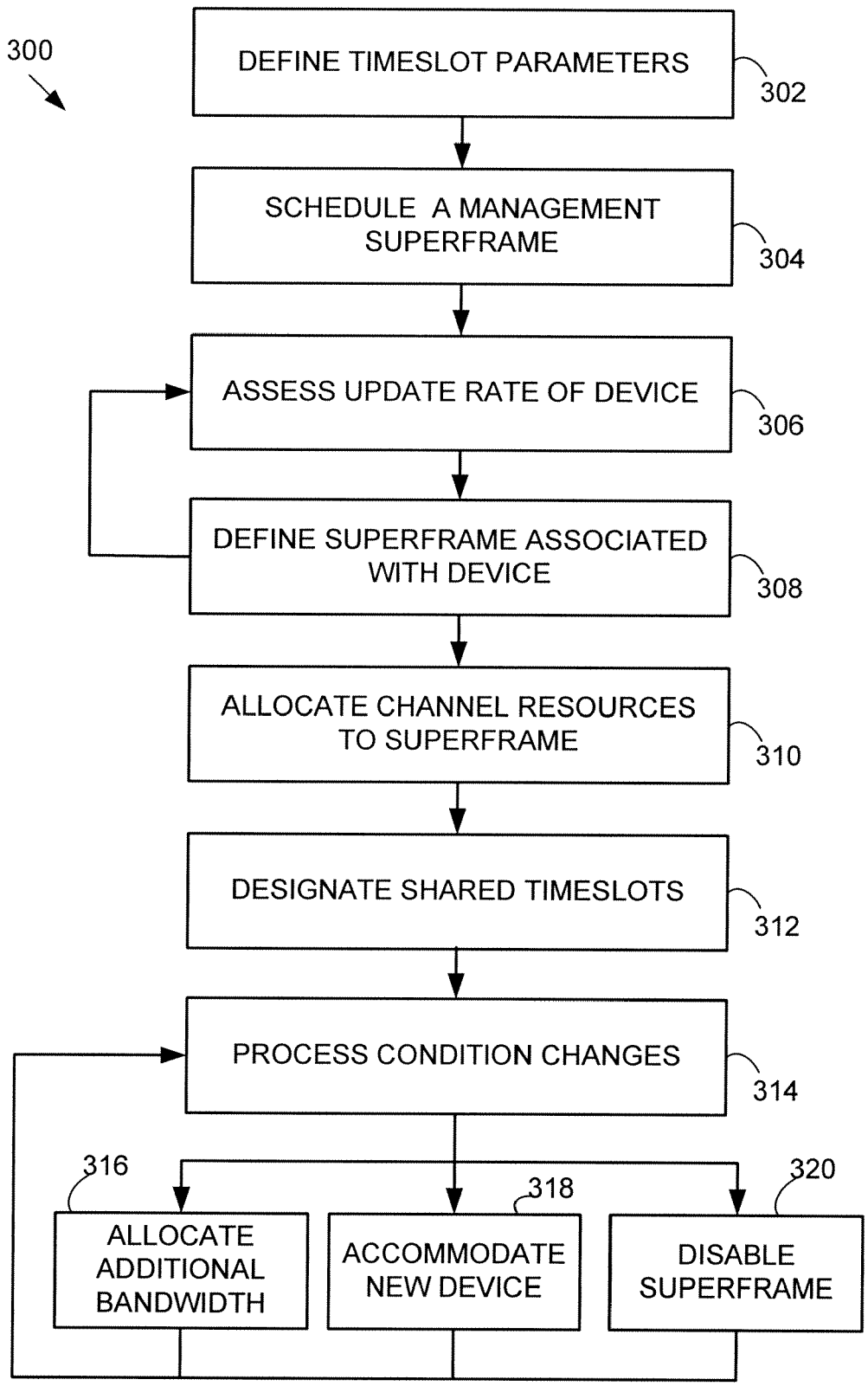

FIG. 8 is an exemplary procedure which a network manager may execute to service a wireless network utilizing the scheduling techniques discussed herein.

DETAILED DESCRIPTION

Figure 1:
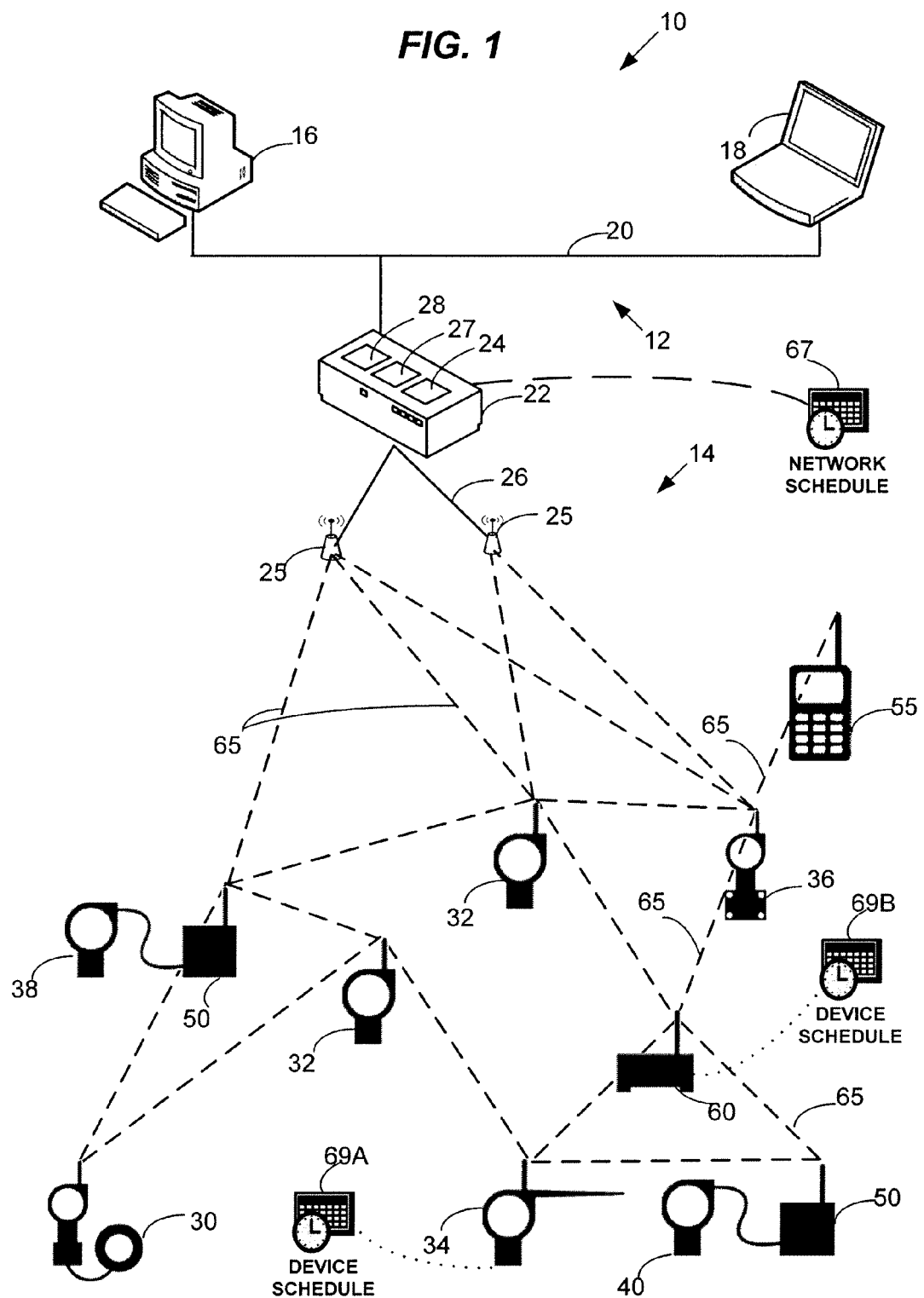
FIG. 1 is a block diagram that illustrates a system utilizing a WirelessHART network to provide wireless communication between field devices and router devices, which are connected to a plant automation network via a gateway device.

FIG. 1 illustrates an exemplary network 10 in which the wireless scheduling and transmission techniques described herein may be used. In particular, the network 10 may include a plant automation network 12 connected to a wireless communication network 14. The plant automation network 12 may include one or more stationary workstations 16 and one or more portable workstations 18 connected over a communication backbone 20 which may be implemented using Ethernet, RS-485, Profibus DP, or using other suitable communication hardware and protocol. The workstations and other equipment forming the plant automation network 12 may provide various control and supervisory functions to plant personnel, including access to devices in the wireless network 14. The plant automation network 12 and the wireless network 14 may be connected via a gateway device 22. More specifically, the gateway device 22 may be connected to the backbone 20 in a wired manner and may communicate with the plant automation network 12 using any suitable (e.g., known) communication protocol. The gateway device 22, which may be implemented in any other desired manner (e.g., as a standalone device, a card insertable into an expansion slot of the host workstations 16 or 18, as a part of the input/output (IO) subsystem of a PLC-based or DCS-based system, etc.), may provide applications that are running on the network 12 with access to various devices of the wireless network 14. In addition to protocol and command conversion, the gateway device 22 may provide synchronized clocking used by time slots and superframes (sets of communication time slots spaced equally in time) of a scheduling scheme associated with a wireless protocol (referred to herein as a WirelessHART protocol) implemented in the network 14.

In some configurations, the network 10 may include more than one gateway device 22 to improve the efficiency and reliability of the network 10. In particular, multiple gateway devices 22 may provide additional bandwidth for the communication between the wireless network 14 and the plant automation network 12, as well as the outside world. On the other hand, the gateway 22 device may request bandwidth from the appropriate network service according to the gateway communication needs within the wireless network 14. A network manager software module 27, which may reside in the gateway device 22, may further reassess the necessary bandwidth while the system is operational. For example, the gateway device 22 may receive a request from a host residing outside of the wireless network 14 to retrieve a large amount of data. The gateway device 22 may then request the network manager 27 to allocate additional bandwidth to accommodate this transaction. For example, the gateway device 22 may issue an appropriate service request. The gateway device 22 may then request the network manager 27 to release the bandwidth upon completion of the transaction.

In general, the network manager 27 may be responsible for adapting the wireless network 14 to changing conditions and for scheduling communication resources. As network devices join and leave the network, the network manager 27 may update its internal model of the wireless network 14 and use this information to generate communication schedules and communication routes. Additionally, the network manager 27 may consider the overall performance of the wireless network 14 as well as the diagnostic information to adapt the wireless network 14 to changes in topology and communication requirements. Once the network manager 27 has generated the overall communication schedule, all or respective parts of the overall communication schedule may be transferred through a series of commands from the network manager 27 to the network devices.

To further increase bandwidth and improve reliability, the gateway device 22 may be functionally divided into a virtual gateway 24 and one or more network access points 25, which may be separate physical devices in wired communication with the gateway device 22. However, while FIG. 1 illustrates a wired connection 26 between the physically separate gateway device 22 and the access points 25, it will be understood that the elements 22-26 may also be provided as an integral device. Because the network access points 25 may be physically separated from the gateway device 22, the access points 25 may be strategically placed in several different locations with respect to the network 14. In addition to increasing the bandwidth, multiple access points 25 can increase the overall reliability of the network 14 by compensating for a potentially poor signal quality at one access point 25 using the other access point 25. Having multiple access points 25 also provides redundancy in case of a failure at one or more of the access points 25.

In addition to allocating bandwidth and otherwise bridging the networks 12 and 14, the gateway device 22 may perform one or more managerial functions in the wireless network 14. As illustrated in FIG. 1, a network manager software module 27 and a security manager software module 28 may be stored in and executed in the gateway device 22. Alternatively, the network manager 27 and/or the security manager 28 may run on one of the hosts 16 or 18 in the plant automation network 12. For example, the network manager 27 may run on the host 16 and the security manager 28 may run on the host 18. The network manager 27 may be responsible for configuration of the network 14, scheduling communication between wireless devices, managing routing tables associated with the wireless devices, monitoring the overall health of the wireless network 14, reporting the health of the wireless network 14 to the workstations 16 and 18, as well as other administrative and supervisory functions. Although a single active network manager 27 may be sufficient in the wireless network 14, redundant network managers 27 may be similarly supported to safeguard the wireless network 14 against unexpected equipment failures. Meanwhile, the security manager 28 may be responsible for protecting the wireless network 14 from malicious or accidental intrusions by unauthorized devices. To this end, the security manager 28 may manage authentication codes, verify authorization information supplied by devices attempting to join the wireless network 14, update temporary security data such as expiring secret keys, and perform other security functions.

With continued reference to FIG. 1, the wireless network 14 may include one or more field devices 30-36. In general, process control systems, like those used in chemical, petroleum or other process plants, include such field devices as valves, valve positioners, switches, sensors (e.g., temperature, pressure and flow rate sensors), pumps, fans, etc. Field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

In one embodiment, the wireless protocol supporting network devices 30-36 of the wireless network 14 is an extension of the known wired HART protocol, a widely accepted industry standard, that maintains the simple workflow and practices of the wired environment. In this sense, the network devices 30-36 may be considered WirelessHART devices. The same tools used for wired HART devices may be easily adapted to wireless devices 30-36 with a simple addition of new device description files. In this manner, the wireless protocol may leverage the experience and knowledge gained using the wired HART protocol to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, reduces the cost associated with developing and supporting devices that may be used with such networks. Some of the additional benefits of a wireless extension of the well-known HART protocol include access to measurements that were difficult or expensive to obtain with wired devices and the ability to configure and operate instruments from system software that can be installed on laptops, handhelds, workstations, etc. Another benefit is the ability to send diagnostic alerts from wireless devices back through the communication infrastructure to a centrally located diagnostic center. For example, every heat exchanger in a process plant could be fitted with a WirelessHART device and the end user and supplier could be alerted when a heat exchanger detects a problem. Yet another benefit is the ability to monitor conditions that present serious health and safety problems. For example, a WirelessHART device could be placed in flood zones on roads and be used to alert authorities and drivers about water levels. Other benefits include access to a wide range of diagnostics alerts and the ability to store trended as well as calculated values at the WirelessHART devices so that, when communications to the device are established, the values can be transferred to a host. In this manner, the WirelessHART protocol can provide a platform that enables host applications to have wireless access to existing HART-enabled field devices and the WirelessHART protocol can support the deployment of battery operated, wireless only HART-enabled field devices. The WirelessHART protocol may be used to establish a wireless communication standard for process applications and may further extend the application of HART communications and the benefits that this protocol provides to the process control industry by enhancing the basic HART technology to support wireless process automation applications.

Referring again to FIG. 1, the field devices 30-36 may be WirelessHART field devices, each provided as an integral unit and supporting all layers of the WirelessHART protocol stack. For example, in the network 14, the field device 30 may be a WirelessHART flow meter, the field devices 32 may be WirelessHART pressure sensors, the field device 34 may be a WirelessHART valve positioner, and the field device 36 may a WirelessHART pressure sensor. Importantly, the wireless devices 30-36 may support all of the HART features that users have come to expect from the wired HART protocol. As one of ordinary skill in the art will appreciate, one of the core strengths of the HART protocol is its rigorous interoperability requirements. In some embodiments, all WirelessHART equipment includes core mandatory capabilities in order to allow equivalent device types (made by different manufacturers, for example) to be interchanged without compromising system operation. Furthermore, the WirelessHART protocol is backward compatible to HART core technology such as the device description language (DDL). In the preferred embodiment, all of the WirelessHART devices should support the DDL, which ensures that end users immediately have the tools to begin utilizing the WirelessHART protocol.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adaptor (WHA) 50. Additionally, the WHA 50 may support other communication protocols such as Foundation® Fieldbus, PROFIBUS, DevicesNet, etc. In these embodiments, the WHA 50 supports protocol translation on a lower layer of the protocol stack. Additionally, it is contemplated that a single WHA 50 may also function as a multiplexer and may support multiple HART or non-HART devices.

Plant personnel may additionally use handheld devices for installation, control, monitoring, and maintenance of network devices. Generally speaking, handheld devices are portable equipment that can connect directly to the wireless network 14 or through the gateway devices 22 as a host on the plant automation network 12. As illustrated in FIG. 1, a WirelessHART-connected handheld device 55 may communicate directly with the wireless network 14. When operating with a formed wireless network 14, the handheld device 55 may join the network 14 as just another WirelessHART field device. When operating with a target network device that is not connected to a WirelessHART network, the handheld device 55 may operate as a combination of the gateway device 22 and the network manager 27 by forming its own wireless network with the target network device.

A plant automation network-connected handheld device (not shown) may be used to connect to the plant automation network 12 through known networking technology, such as Wi-Fi. This device communicates with the network devices 30-40 through the gateway device 22 in the same fashion as external plant automation servers (not shown) or the workstations 16 and 18 communicate with the devices 30-40.

Additionally, the wireless network 14 may include a router device 60 which is a network device that forwards packets from one network device to another network device. A network device that is acting as a router device uses internal routing tables to conduct routing, i.e., to decide to which network device a particular packet should be sent. Standalone routers such as the router 60 may not be required in those embodiments where all of the devices on the wireless network 14 support routing. However, it may be beneficial (e.g. to extend the network, or to save the power of a field device in the network) to add one or more dedicated routers 60 to the network 14.

All of the devices directly connected to the wireless network 14 may be referred to as network devices. In particular, the wireless field devices 30-36, the adapters 50, the routers 60, the gateway devices 22, the access points 25, and the wireless handheld device 55 are, for the purposes of routing and scheduling, network devices, each of which forms a node of the wireless network 14. In order to provide a very robust and an easily expandable wireless network, all of the devices in a network may support routing and each network device may be globally identified by a substantially unique address, such as a HART address, for example. The network manager 27 may contain a complete list of network devices and may assign each device a short, network unique 16-bit nickname. Additionally, each network device may store information related to update rates, connection sessions, and device resources. In short, each network device maintains up-to-date information related to routing and scheduling within the wireless network 14. The network manager 27 may communicate this information to network devices whenever new devices join the network or whenever the network manager 27 detects or originates a change in topology or scheduling of the wireless network 14.

Further, each network device may store and maintain a list of neighbor devices that the network device has identified during listening operations. Generally speaking, a neighbor of a network device is another network device of any type potentially capable of establishing a connection with the network device in accordance with the standards imposed by a corresponding network. In case of the WirelessHART network 14, the connection is a direct wireless connection. However, it will be appreciated that a neighboring device may also be a network device connected to the particular device in a wired manner. As will be discussed later, network devices promote their discovery by other network devices through advertisement, or special messages sent out during designated periods of time. Network devices operatively connected to the wireless network 14 have one or more neighbors which they may choose according to the strength of the advertising signal or to some other principle.

In the example illustrated in FIG. 1, each of a pair of network devices that are connected by a direct wireless connection 65 recognizes the other as a neighbor. Thus, network devices of the wireless network 14 may form a large number of inter-device connections 65. The possibility and desirability of establishing a direct wireless connection 65 between two network devices is determined by several factors, such as the physical distance between the nodes, obstacles between the nodes (devices), signal strength at each of the two nodes, etc. Further, two or more direct wireless connections 65 may be used to form communication paths between nodes that cannot form a direct wireless connection 65. For example, the direct wireless connection 65 between the WirelessHART hand-held device 55 and WirelessHART device 36 along with the direct wireless connection 65 between the WirelessHART device 36 the router 60 form a communication path between the devices 55 and 60.

Each wireless connection 65 is characterized by a large set of parameters related to the frequency of transmission, the method of access to a radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (e.g., 2.4 GHz). While the system and method discussed herein may be applied to a wireless network operating on any designated frequency or range of frequencies, the example embodiment discussed below relates to the wireless network 14 operating in the unlicensed, or shared part of the radio spectrum. In accordance with this embodiment, the wireless network 14 may be easily activated and adjusted to operate in a particular unlicensed frequency range as needed.

One of the core requirements for a wireless network protocol using an unlicensed frequency band is the minimally disruptive coexistence with other equipment utilizing the same band. Coexistence generally defines the ability of one system to perform a task in a shared environment in which other systems can similarly perform their tasks while conforming to the same set of rules or to a different (and possibly unknown) set of rules. One requirement of coexistence in a wireless environment is the ability of the protocol to maintain communication while interference is present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the particular system may ask what impact the transmitted signal of one transmitter has on other radio system operating in proximity to the particular system. More specifically, the operator may ask whether the transmitter disrupts communication of some other wireless device every time the transmitter turns on or whether the transmitter spends excessive time on the air effectively "hogging" the bandwidth. Ideally, each transmitter should be a "silent neighbor" that no other transmitter notices. While this ideal characteristic is rarely, if ever, attainable, a wireless system that creates a coexistence environment in which other wireless communication systems may operate reasonably well may be called a "good neighbor." The second aspect of coexistence of a wireless system is the ability of the system to operate reasonably well in the presence of other systems or wireless signal sources. In particular, the robustness of a wireless system may depend on how well the wireless system prevents interference at the receivers, on whether the receivers easily overload due to proximate sources of RF energy, on how well the receivers tolerate an occasional bit loss, and similar factors. In some industries, including the process control industry, there are a number of important potential applications in which the loss of data is frequently not allowable. A wireless system capable of providing reliable communications in a noisy or dynamic radio environment may be called a "tolerant neighbor."

Effective coexistence (i.e., being a good neighbor and a tolerant neighbor) relies in part on effectively employing three aspects of freedom: time, frequency and distance. Communication can be successful when it occurs 1) at a time when the interference source (or other communication system) is quiet; 2) at a different frequency than the interference signal; or 3) at a location sufficiently removed from the interference source. While a single one of these factors could be used to provide a communication scheme in the shared part of the radio spectrum, a combination of two or all three of these factors can provide a high degree of reliability, security and speed.

Still referring to FIG. 1, the network manager 27 or another application or service running on the network 14 or 12 may define a master network schedule 67 for the wireless communication network 14 in view of the factors discussed above. The master network schedule 67 may specify the allocation of resources such as time segments and radio frequencies to the network devices 25 and 30-55. In particular, the master network schedule 67 may specify when each of the network devices 25 and 30-55 transmits process data, routes data on behalf of other network devices, listens to management data propagated from the network manager 27, and transmits advertisement data for the benefit of devices wishing to join the wireless network 14. To allocate the radio resources in an efficient manner, the network manager 27 may define and update the master network schedule 67 in view of the topology of the wireless network 14. More specifically, the network manager 27 may allocate the available resources to each of the nodes of the wireless network 14 (i.e., wireless devices 30-36, 50, and 60) according to the direct wireless connections 65 identified at each node. In this sense, the network manager 27 may define and maintain the network schedule 67 in view of both the transmission requirements and of the routing possibilities at each node.

The master network schedule 67 may partition the available radio sources into individual communication channels, and further measure transmission and reception opportunities on each channel in such units as Time Division Multiple Access (TDMA) communication timeslots, for example. In particular, the wireless network 14 may operate within a certain frequency band which, in most cases, may be safely associated with several distinct carrier frequencies, so that communications at one frequency may occur at the same time as communications at another frequency within the band. One of ordinary skill in the art will appreciate that carrier frequencies in a typical application (e.g., public radio) are sufficiently spaced apart to prevent interference between the adjacent carrier frequencies. For example, in the 2.4 GHz band, IEEE assigns frequency 2.455 to channel number 21 and frequency 2.460 to channel number 22, thus allowing the spacing of 5 KHz between two adjacent segments of the 2.4 GHz band. The master network schedule 67 may thus associate each communication channel with a distinct carrier frequency, which may be the center frequency in a particular segment of the band.

Meanwhile, as typically used in the industries utilizing TDMA technology, the term "timeslot" refers to a segment of a specific duration into which a larger period of time is divided to provide a controlled method of sharing. For example, a second may be divided into 10 equal 100 millisecond timeslots. Although the master network schedule 67 preferably allocates resources as timeslots of a single fixed duration, it is also possible to vary the duration of the timeslots, provided that each relevant node of the wireless network 14 is properly notified of the change. To continue with the example definition of ten 100-millisecond timeslots, two devices may exchange data every second, with one device transmitting during the first 100 ms period of each second (i.e., the first timeslot), the other device transmitting during the fourth 100 ms period of each second (i.e., the fourth timeslot), and with the remaining timeslots being unoccupied. Thus, a node on the wireless network 14 may identify the scheduled transmission or reception opportunity by the frequency of transmission and the timeslot during which the corresponding device may transmit or receive data.

As part of defining an efficient and reliable network schedule 67, the network manager 27 may logically organize timeslots into cyclically repeating sets, or superframes. As used herein, a superframe may be more precisely understood as a series of equal superframe cycles, each superframe cycle corresponding to a logical grouping of several adjacent time slots forming a contiguous segment of time. The number of time slots in a given superframe defines the length of the superframe and determines how often each time slot repeats. In other words, the length of a superframe, multiplied by the duration of a single timeslot, specifies the duration of a superframe cycle. Additionally, the timeslots within each frame cycle may be sequentially numbered for convenience. To take one specific example, the network manager 27 may fix the duration of a timeslot at 10 milliseconds and may define a superframe of length 100 to generate a 1-second frame cycle (i.e., 10 milliseconds multiplied by 100). In a zero-based numbering scheme, this example superframe may include timeslots numbered 0, 1, . . . 99.

As discussed in greater detail below, the network manager 27 reduces latency and otherwise optimizes data transmissions by including multiple concurrent superframes of different sizes in the network schedule 67. Moreover, some or all of the superframes of the network schedule 67 may span multiple channels, or carrier frequencies. Thus, the master network schedule 67 may specify the association between each timeslot of each superframe and one of the available channels.

Thus, the master network schedule 67 may correspond to an aggregation of individual device schedules. For example, a network device, such as the valve positioner 34, may have an individual device schedule 69A. The device schedule 69A may include only the information relevant to the corresponding network device 34. Similarly, the router device 60 may have an individual device schedule 69B. Accordingly, the network device 34 may transmit and receive data according to the device schedule 69A without knowing the schedules of other network devices such as the schedule 69B of the device 60. To this end, the network manager 27 may manage both the overall network schedule 67 and each of the individual device schedules 69 (e.g., 69A and 69B) and communicate the individual device schedules 69 to the corresponding devices when necessary. In other embodiments, the individual network devices 25 and 35-50 may at least partially define or negotiate the device schedules 69 and report these schedules to the network manager 27. According to this embodiment, the network manager 27 may assemble the network schedule 67 from the received device schedules 69 while checking for resource contention and resolving potential conflicts.

Figure 2:
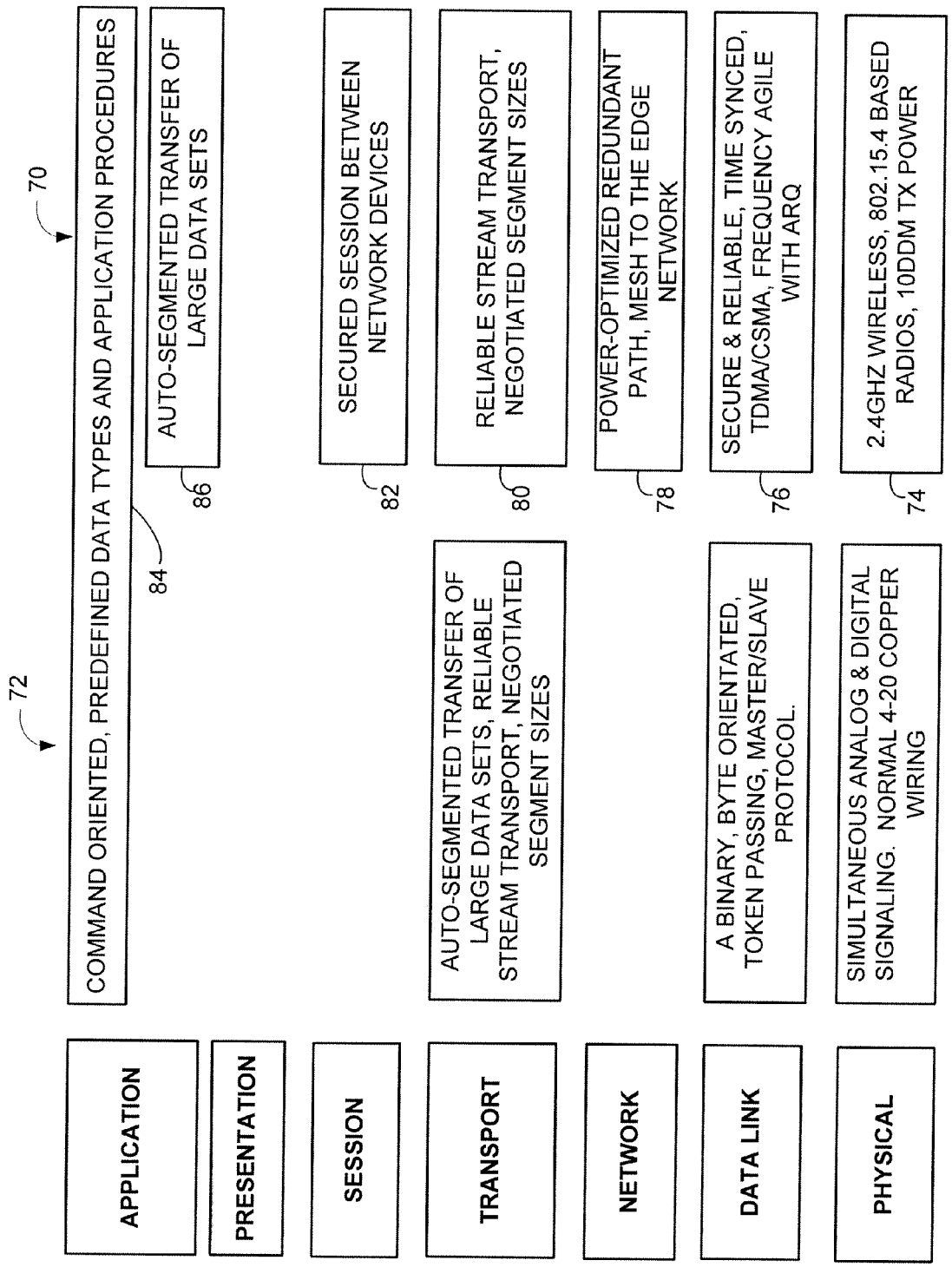
FIG. 2 is a schematic representation of the layers of a WirelessHART protocol implemented in accordance with one of the embodiments discussed herein.

The communication protocol supporting the wireless network 14 generally described above is referred to herein as the WirelessHART protocol 70, and the operation of this protocol is discussed in more detail with respect to FIG. 2. As will be understood, each of the direct wireless connections 65 may transfer data according to the physical and logical requirements of the WirelessHART protocol 70. Meanwhile, the WirelessHART protocol 70 may efficiently support communications within timeslots and on the carrier frequencies associated with the superframes defined by the device-specific schedules 69.

FIG. 2 schematically illustrates the layers of one example embodiment of the WirelessHART protocol 70, approximately aligned with the layers of the well-known ISO/OSI 7-layer model for communications protocols. By way of comparison, FIG. 2 additionally illustrates the layers of the existing "wired" HART protocol 72. It will be appreciated that the WirelessHART protocol 70 need not necessarily have a wired counterpart. However, as will be discussed in detail below, the WirelessHART protocol 70 can significantly improve the convenience of its implementation by sharing one or more upper layers of the protocol stack with an existing protocol. As indicated above, the WirelessHART protocol 70 may provide the same or greater degree of reliability and security as the wired protocol 72 servicing a similar network. At the same time, by eliminating the need to install wires, the WirelessHART protocol 70 may offer several important advantages, such as the reduction of cost associated with installing network devices, for example. It will be also appreciated that although FIG. 2 presents the WirelessHART protocol 70 as a wireless counterpart of the HART protocol 72, this particular correspondence is provided herein by way of example only. In other possible embodiments, one or more layers of the WirelessHART protocol 70 may correspond to other protocols or, as mentioned above, the WirelessHART protocol 70 may not share even the uppermost application layer with any of the existing protocols.

As illustrated in FIG. 2, the wireless expansion of HART technology may add at least one new physical layer (e.g., the IEEE 802.15.4 radio standard) and two data-link layers (e.g., wired and wireless mesh) to the known HART implementation. In general, the WirelessHART protocol 70 may be a secure, wireless mesh networking technology operating in the 2.4 GHz ISM radio band (block 74). In one embodiment, the WirelessHART protocol 70 may utilize IEEE 802.15.4b compatible direct sequence spread spectrum (DSSS) radios with channel hopping on a transaction by transaction basis. This WirelessHART communication may be arbitrated using TDMA to schedule link activity (block 76). As such, all communications are preferably performed within a designated time slot. One or more source and one or more destination devices may be scheduled to communicate in a given slot, and each slot may be dedicated to communication from a single source device, or the source devices may be scheduled to communicate using a CSMA/CA-like shared communication access mode. Source devices may send messages to one or more specific target devices or may broadcast messages to all of the destination devices assigned to a slot.

Because the WirelessHART protocol described herein allows deployment of mesh topologies, a significant network layer 78 may be specified as well. In particular, the network layer 78 may enable establishing direct wireless connections 65 between individual devices and routing data between a particular node of the wireless network 14 (e.g., the device 34) and the gateway 22 via one or more intermediate hops. In some embodiments, pairs of network devices 30-50 may establish communication paths including one or several hops while in other embodiments, all data may travel either upstream to the gateway device 22 or downstream from the gateway device 22 to a particular node.

To enhance reliability, the WirelessHART protocol 70 may combine TDMA with a method of associating multiple radio frequencies with a single communication resource, e.g., channel hopping. Channel hopping provides frequency diversity which minimizes interference and reduces multi-path fading effects. In particular, the data link 76 may create an association between a single superframe and multiple carrier frequencies which the data link layer 76 cycles through in a controlled and predefined manner. For example, the available frequency band of a particular instance of the WirelessHART network 14 may have carrier frequencies $F_1, F_2, \ldots F_n$. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link layer 76 of the WirelessHART protocol 70 may offer an additional feature of channel blacklisting, which restricts the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the WirelessHART network 14. In some embodiments, the WirelessHART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple WirelessHART networks 14, the network manager 27 may create an overall schedule for each instance of the WirelessHART network 14. The schedule may be organized into superframes containing time slots numbered relative to the start of the superframe. Additionally, the network manager 27 may maintain a global absolute slot count which may reflect the total of number of time slots scheduled since the start-up of the WirelessHART network 14. This absolute slot count may be used for synchronization purposes.

The WirelessHART protocol 70 may further define links or link objects in order to logically unite scheduling and routing. In particular, a link may be associated with a specific network device, a specific superframe, a relative slot number, one or more link options (transmit, receive, shared), and a link type (normal, advertising, discovery). As illustrated in FIG. 2, the data link layer 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

With continued reference to FIG. 2, the transport layer 80 of the WirelessHART protocol 70 allows efficient, best-effort communication and reliable, end-to-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis. In contrast, reliable communications allow devices to send acknowledgement packets. In addition to guaranteeing data delivery, the transport layer 80 may order packets sent between network devices. This approach may be preferable for request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the WirelessHART network 14 to activate a new superframe. Alternatively, a field device such as the sensor 30 may generate a packet and propagate the request to another field device such as to the portable HART communicator 55. As another example, an alarm or event generated by the 34 field device may be transmitted as a request directed to the gateway device 22. In response to successfully receiving this request, the gateway device 22 may generate a response packet and send the response packet to the device 34, acknowledging receipt of the alarm or event notification.

Referring again to FIG. 2, the session layer 82 may provide session-based communications between network devices. End-to-end communications may be managed on the network layer by sessions. A network device may have more than one session defined for a given peer network device. If desired, almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the WirelessHART protocol 70 and the wired HART protocol 72 may support a common HART application layer 84. The application layer of the WirelessHART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Figure 3:
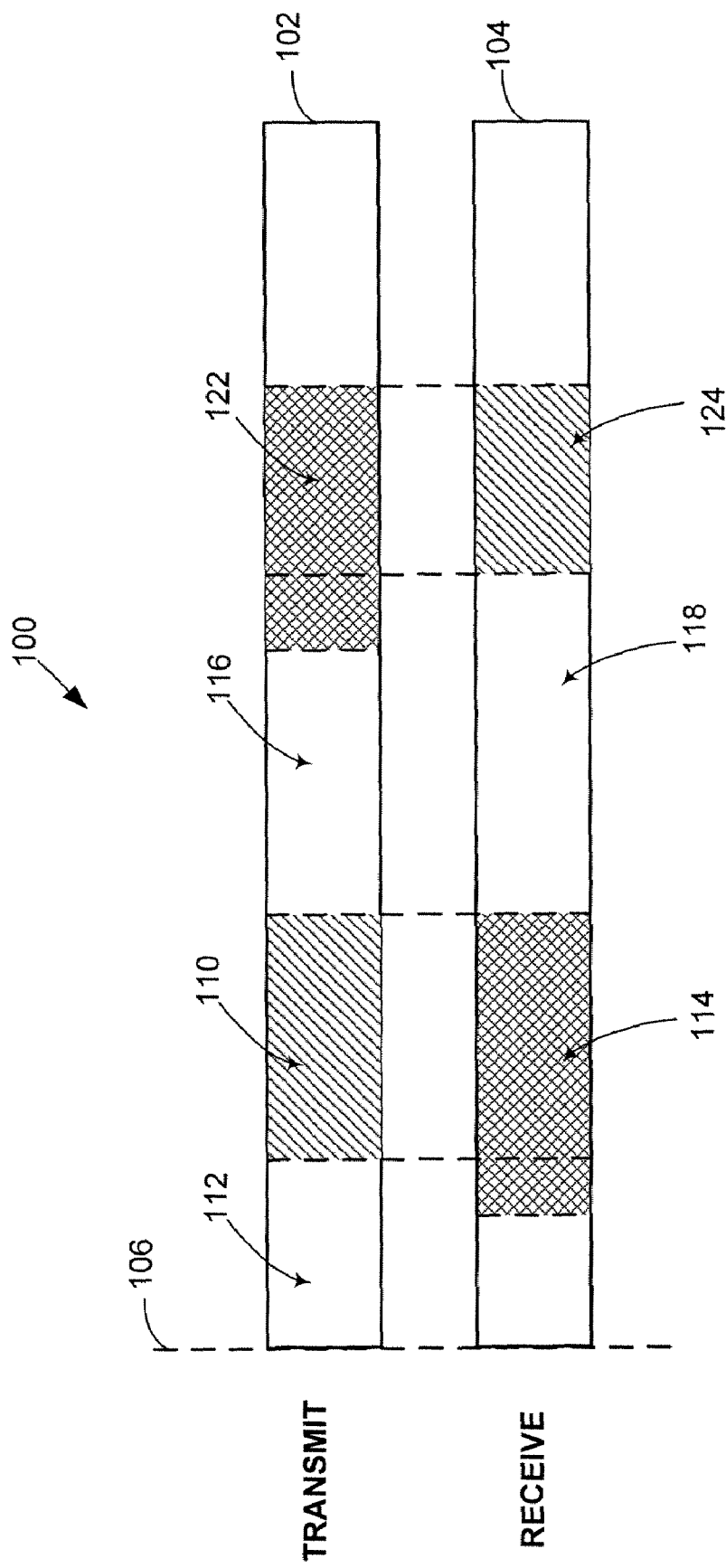
FIG. 3 is a block diagram that illustrates segments of a communication timeslot defined in accordance with one of the embodiments discussed herein.
Figure 4:
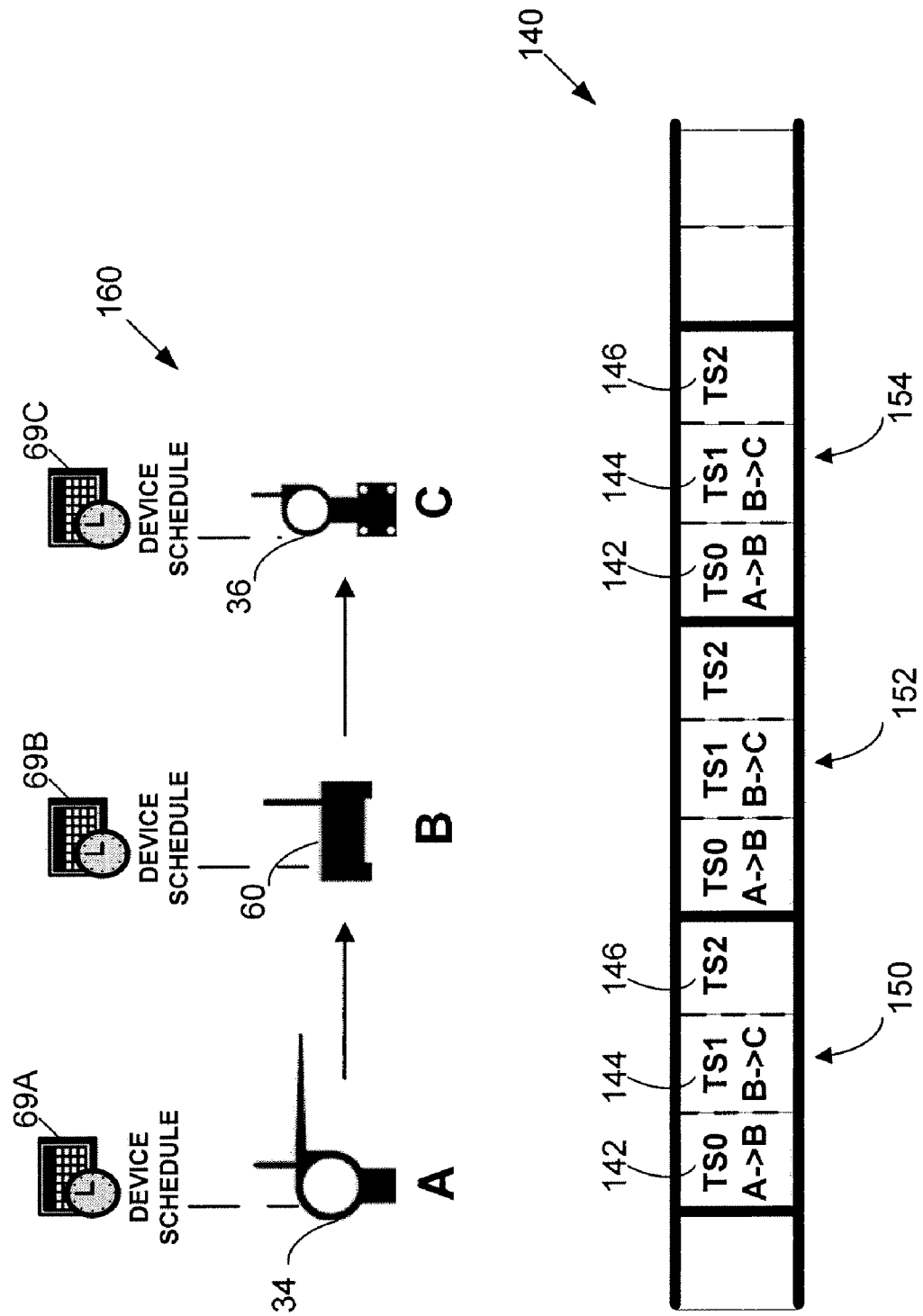
FIG. 4 is a block diagram that illustrates an exemplary association of timeslots of a three-slot superframe with several communicating devices.

FIGS. 3-6 provide a more detailed illustration of channel and timeslot resource allocation supported by the data link layer 76 and the network layer 78 of the WirelessHART protocol 70. As discussed above in reference to FIG. 1, the network manager 27 may manage the definition of one or more superframes and may associate individual timeslots within each of the defined superframes with one of the available channels (e.g., carrier frequencies). By way of one specific example, FIG. 3 illustrates a possible communication scheme within an individual timeslot, while FIG. 4 illustrates an example data exchange between several devices using the timeslots of a certain superframe. Next, FIG. 5 illustrates a possible association between an example timeslot and several available channels, and FIG. 6 is a schematic representation of several concurrent superframes which include the timeslots illustrated in FIGS. 3-5.

Referring specifically to FIG. 3, two or mode network devices may exchange data in a timeslot 100, which may be a dedicated timeslot shared by one transmitting device and one receiving device or a shared timeslot having more than one transmitter and/or one or more receivers. In either case, the timeslot 100 may have a transmit schedule 102 and a receive schedule 104. In other words, one or more transmitting devices may communicate within the timeslot 100 according to the transmit timeslot schedule 102 while one or more receiving devices may communicate within the timeslot 100 according to the receive timeslot schedule 104. Of course, the timeslot schedules 102 and 104 are substantially precisely synchronized and begin at the same relative time 106. Over the course of the timeslot 100, a transmitting network device sends a predetermined amount of data over a communication channel such as a carrier radio frequency. In some cases, the transmitting network device may also expect to receive a positive or negative acknowledgement within the same timeslot 100.

Thus, as illustrated in FIG. 3, the transmit timeslot schedule 102 may include a transmit segment 110 for transmitting outbound data, preceded by a pre-transmission segment 112, and may include a receive segment 122 for receiving an acknowledgement for the data transmitted during the segment 110. The transmit segment 110 may be separated from the receive segment 122 by a transition segment 116, during which the corresponding network device may adjust the hardware settings, for example. Meanwhile, the receive schedule 104 may include segments for performing functions complementary to those carried out in the segments 112-122, as discussed below.

In particular, the transmitting device may send out the entire packet or stream segment associated with a capacity of the timeslot 100 during the segment 110. As mentioned above, the network schedule 69 may include shared timeslots which do not exclusively belong to an individual device schedule 67 of one of the network devices 25 and 30-55. For example, a shared timeslot may have a dedicated receiver such as the gateway device 22 but no single dedicated transmitter. When necessary, one of the network devices 25-60 may transmit unscheduled information, such as a request for additional bandwidth, over the shared timeslot. In these cases, the potentially transmitting device may check whether the shared timeslot is available by performing Clear Channel Assessment (CCA) in a pre-transmission segment 112. In particular, the transmitting network device may listen to signals propagated over the communication channel associated with the timeslot 100 for the duration of the pre-transmission segment 112 to confirm that no other network device is attempting to use the timeslot 100.

On the receiving end of the timeslot 100, the receiving device may receive the entire packet associated with the timeslot 100 within a packet receive segment 114. As illustrated in FIG. 3, the packet receive segment 114 may begin at an earlier point in time than the transmit segment 110. Next, the transmit timeslot schedule 102 requires that the transmitting device transition the radio mode in a transition segment 116. Similarly, the receive timeslot schedule 104 includes a transition segment 118. However, the segment 116 may be shorter than the segment 118 because the transmitting device may start listening for acknowledgement data early to avoid missing a beginning of an acknowledgement.

Still further, the transmit schedule 102 may include an acknowledgement receive segment 122 during which the transmitting device receives an acknowledgement transmitted during an acknowledgement transmit segment 124 associated with the receive schedule 104. The transmitting device may delete the packet transmitted during the transmit segment 110 from an associated transmit queue upon receiving a positive acknowledgement. On the other hand, the transmitting device may attempt to re-transmit the packet in the next scheduled dedicated timeslot or in the next available shared timeslot if no acknowledgement arrives or if the acknowledgement is negative.

Several timeslots 100 discussed above may be organized into a superframe 140, as schematically illustrated in FIG. 4. In particular, the superframe 140 may include a (typically) infinite series of superframe cycles 150-154, each cycle including a set if timeslots, illustrated in FIG. 4 as a timeslot 142 with a relative timeslot number 0 (TS0), a timeslot 144 with a relative timeslot number 1 (TS1), and a timeslot 146 with a relative timeslot number 2 (TS2). Accordingly, the size of the superframe 140 of FIG. 4 is three timeslots. In other words, each of the timeslots 142-146 of the superframe 140 repeats in time at an interval of two intermediate timeslots. Thus, for a 10 millisecond timeslot, the interval between the end of a timeslot with a particular relative slot number and the beginning of a next timeslot with the same relative slot number is 20 milliseconds. Conceptually, the timeslots 142-146 may be further grouped into superframe cycles 150-154. As illustrated in FIG. 4, each superframe cycle corresponds to a new instance of a sequence of timeslots 142-146.

The master network schedule 67 may associate transmission and reception opportunities of some of the network devices participating in the wireless network 14 with particular timeslots of the superframe 140. Referring again to FIG. 4, a network fragment 160 schematically illustrates a partial communication scheme implemented between the network devices 34, 60, and 36 of FIG. 1. To simplify the illustration of the superframe 140, the network devices 34, 60, and 36 are additionally designed in FIG. 4 as nodes A, B, and C, respectively. Thus, according to FIG. 4, the node A transmits data to the node B which, in turn, transmits data to the node C. As discussed above, each of the nodes A-C includes a device schedule 69A-C, which specifies the timeslots and channels (e.g., radio carrier frequencies) for transmitting and receiving data at the corresponding device. The master network schedule 67 may include part of all of the data information stored in the individual device schedules 69A-C. More specifically, the network manager 27 may maintain the master network schedule 67 as an aggregate of the schedules associated with each of the network devices 30-50, including the device schedules 69A-C.

In this example, the duration of the timeslot 100 (FIG. 3) may be 10 milliseconds and the network device A may report data to the device C every 30 milliseconds. Accordingly, the network manager 27 may set the length of the superframe 140 at three timeslots specifically in view of the update rate of the network device A. Further, the network manager 27 may assign the timeslot 142 with a relative number 0 (TS0) to the network devices A and B, with the device A as the transmitter and the device B as the receiver. The network manager 27 may further allocate the next available timeslot 144, having the relative slot number 1 (TS1), to be associated with the transmission from the device B to the device C. Meanwhile, the timeslot 146 remains unassigned. In this manner, the superframe 140 provides a scheme according to which the network manager 27 may allocate resources in the network fragment 160 for the transmission of data from the device A to the device C in view of the available wireless connections between the devices A, B, and C.

In the example illustrated in FIG. 4, the network device at node A may store information related to the timeslot 142 as part of its device schedule 69A. Similarly, the network device at node B may store information related to the timeslots 142 (receive) and 144 (transmit) as part of its device schedule 69B. Finally, the network device C may store information related to the timeslot 144 in the device schedule 69C. In at least some of the embodiments, the network manager 27 stores information about the entire superframe 140, including an indication that the timeslot 146 is available.

Importantly, the superframe 140 need not be restricted to a single radio frequency or other single communication channel. In other words, the individual timeslots 142-146 defining the superframe 140 may be associated with different radio frequencies on a permanent or floating basis. Moreover, the frequencies used by the various devices need not always be adjacent in the electromagnetic spectrum. In one embodiment, for example, the timeslot 142 of each of the superframe cycles 150-154 may be associated with a carrier frequency $F_1$ and the timeslot 144 of each of the superframe cycles 150-154 may be associated with a carrier frequency $F_2$, with the frequencies $F_1$ and $F_2$ being adjacent or non-adjacent in the electromagnetic spectrum.

In another embodiment, at least some of the timeslots 142-146 may move about the allocated frequency band in a predefined manner. FIG. 5 illustrates an example association of the timeslot 144 of FIG. 4 with channels 172-179 (corresponding to frequency sub-bands $F_1$-$F_5$) in the available frequency band 170. In particular, each of the channels 172-179 may correspond to one of the center frequencies $F_1, F_2, \ldots F_5$ which preferably differ from their respective neighbors by the same offset. The channels 172-179 preferably form a continuous section of the spectrum covering the entire available frequency band 170, although the channels 172-179 need be contiguous or form a continuous band in all embodiments. The superframe 140 may use at least a portion of the frequency band 170, so that one or more of the timeslots 142-146 are scheduled on different carrier frequencies in at least two consecutive cycles.

As illustrated in FIG. 5, the timeslot 144 may use the channel 176 (frequency $F_3$) during the frame cycle 150, may use the channel 174 (frequency $F_4$) during the frame cycle 152, and may use the channel 178 (frequency $F_2$) during the frame cycle 154. The timeslot 144 may then "return" to the channel 176 in the next superframe cycle 150A, which may similar to the cycle 150. Each of the specific associations of the timeslot 144 with one of the channels 172-179 is illustrated as a timeslot/channel tuple 144A-C. For example, the tuple 144A specifies the timeslot 2 scheduled, in the cycle 150, on the channel 176 associated with the center frequency $F_3$. Similarly, the tuple 144B specifies the timeslot 2 scheduled, in the cycle 152, on the channel 174 associated with the center frequency $F_4$. Meanwhile, the channel 172 associated with the center frequency $F_5$ may not be assigned to the timeslot 2 during any of the cycles 150-152. However, a different timeslot of the superframe 140 such as the timeslot 146, for example, may be associated with the channel 172 during one or more of the cycles 150-152.

In this example, the frequency assignment associated with the superframe cycle 150 may repeat immediately following the cycle 154 (illustrated as a cycle 150A in the FIG. 5), and the timeslot 144 may again correspond to the tuple 144A after two cycles of the superframe 140. Thus, the timeslot 144 may regularly cycle through the channels 176, 174, and 178. It will be appreciated that the timeslot 144 may similarly cycle through a greater or smaller number of channels irrespective of the length of the superframe 140, provided, of course, that enough channels are available in the frequency band 170. The association of a single timeslot with multiple channels during different superframe cycles, discussed above with respect to FIG. 5 and referred to herein as "channel hopping," significantly increases the reliability of the wireless network 14. In particular, channel hopping reduces the probability that a pair of devices, scheduled to communicate in a particular timeslot of a certain superframe, fail to transmit and receive data when a certain channel is jammed or otherwise unavailable. Thus, for example, the failure of the channel 174 prevents the devices using the timeslot 144 from communicating in the frame cycle 152 but not during the frame cycles 150 or 154.

Referring again to FIG. 4, the device schedules 69B and 69C may include the information regarding each of the tuples 144A-C discussed above in reference to FIG. 5. In particular, each of the device schedules 69B and 69C may store an assignment of the timeslot 144 to one of the channels 172-179 within each of the cycles 150-152. The master network schedule 67 (FIG. 1) may similarly include this information. Meanwhile, the device schedule 69A need not necessarily include the information related to the timeslot 144 because the corresponding node A (the device 34) does not communicate during the timeslot 144 of the superframe 140. In operation, the devices 60 and 36 corresponding to the nodes B and C may prepare for data transmission and reception, respectively, at the beginning of each timeslot 144. To determine whether the timeslot 144 currently corresponds to the tuple 144A, 144B, or 144C, the devices 60 and 36 may apply the global absolute slot count to determine whether the timeslot 144 is currently in the frame cycle 150, 152, or 154.

In the process of defining the network schedule 69, the network manager 27 may define multiple concurrent superframes in view of the update rates of the network devices 25 and 35-50. As illustrated in FIG. 6, the network schedule 69 may include the superframe 140 of length three as well superframes 190 and 192. The superframe 190 may be a five-slot superframe and the superframe 192 may be a four-slot superframe, although the different superframes may have a different number of slots and various different superframes may have the same number of slots. As illustrated in FIG. 6, the superframes need not necessarily align with respect to the relative slot numbers. In particular, at a particular time 194, the superframe 190 may schedule the timeslot with the relative number two (TS2) while the superframes 140 and 192 may schedule the timeslots with the relative number one (TS1). Preferably, the superframes 140, 190, and 192 are time-synchronized so that each transition to a new timeslot within each of these superframes occurs at the same time.

Each of the superframes 140, 190 and 192 may be primarily associated with, or "belong to" an individual one of or a subset of the network devices 30-50. For example, the superframe 140 illustrated in FIG. 4 may belong to the node A (i.e., the network device 34), and the length of the superframe 140 may be advantageously selected so that the node A sends out measurement data to the node B during the timeslot 142 (TS0) once during each of the cycles 150-154. In case the wireless network 14 defines 10 millisecond timeslot, the node A sends data to the node B once every 30 milliseconds. If, however, the node A is reconfigured to report measurements once every 50 milliseconds, the network manager 27, alone or in cooperation with the node A, may reconfigure the frame 140 to have a length of five timeslots instead. In other words, the length of each superframe may reflect a particular transmission requirement of a particular network device 30-50.

On the other hand, more than one network device 30-50 may use a superframe for transmitting or receiving data. Referring again to FIG. 4, the node B (the network device 60) may regularly transmit data to the node C (the network device 36) in the timeslot 144 of the superframe 140, although the superframe 140 may be primarily associated with the node A. Thus, different timeslots of a particular superframe may be used by different network devices to originate, route, or receive data. In a sense, the timeslots of each superframe may be understood as a resource allocated to different devices, with a particular priority assigned to the device that "owns" the superframe. Further, it will be appreciated that each network device may participate in multiple superframes. For example, the network device 34 in FIG. 4 may route data on behalf of other network devices (e.g., the network device 32 illustrated in FIG. 1), in addition to propagating its own data via the router device 60. Preferably, a device participating in multiple superframes does not schedule simultaneous communications in different superframes. While only three superframes are illustrated in FIG. 6, the wireless network 14 of FIG. 1 may include any number of superframes, with each of the different superframes having any desired or useful length based on the types and frequencies of communication being performed in or between particular devices and set of devices.

The methods described above with respect to FIGS. 1-6 may be applied to a process control system, for example, in which various devices report measurements or other data according to individual device schedules, as well during occasional, frequently unpredictable, data "bursts." FIG. 7 illustrates several components of an example chemical batch reactor system 200, in which several wireless devices use the techniques discussed herein to define and optimize the scheduling in a wireless network 204. In particular, the system 200 may include a bioreactor 208 instrumented with several valves 210-214, valve controllers 220-224, and wireless network devices 230-238. For example, the network device 230 may be a WirelessHART flow meter, while the device 234 may be a WirelessHART adapter coupled to a legacy flow meter (not shown).

In the example illustrated in FIG. 7, the valve 210 may control the supply of reagent such as ammonia to the bioreactor 208 and the valve 212 may control the supply of feed such as glucose to the bioreactor 208. Valve controllers 220 and 222 may control the actuators of the valves 210 and 212, respectively, and may communicate with the wireless smart devices 230 and 232 participating in the wireless network 204. Similarly, a controller 224 may control the valve 214 which, in turn, controls the supply of air to the bioreactor 208. Meanwhile, a pH meter 230 may measure the pH level of the compound inside the bioreactor 208 and may report the measurements to the valve controller 220. Additionally or alternatively, the pH meter 230 may report the measurements to a workstation or to another intelligent host communicating with the network 204 via a device (not shown) similar to the gateway device 22. Further, an oxygen meter 234 may collect and report the periodically measured oxygen level to the corresponding gateway. Similarly, a temperature meter 236 may perform periodic measurements of the temperature of the compound inside the bioreactor 202 and communicate these measurements to an external host by propagating the measurements through the wireless network 204. On the other hand, a reactor level meter 238 may supply the level measurements to a controller residing in a plant automation network, similarly routing data through the network 204 to a gateway device.

One skilled in the art will appreciate that the various combinations of valves, valve actuators, and meters form control loops which automatically adjust the settings of the valves or similar mechanical devices based on the feedback information. For example, the devices 210, 220, and 230 may form a feedback loop in which the valve controller 220 controls the valve 210 to either increase or decrease the flow in view of the flow level reported by the flow meter 230. In this sense, the devices 220 and 230 are part of a distributed control system or a DCS.

Alternatively, the wireless devices 230-238 could report measurements to a centralized controller (not shown) which could process the measurements and send commands to the valve controllers 220-224. The devices 220-238 could thus participate in a centralized control scheme. However, irrespective of a control scheme of the wireless network 204, it is clearly desirable to report measurements, actuate valves, and perform other control functions as close to real time as possible. For example, failing to quickly react to a certain change in a parameter, such as pressure, may overfill the bioreactor 208 or result in a hazardous condition or other highly undesirable consequences.

The scheduling approach described herein allows the network manager 27 or similar application to allocate wireless resources in view of the update rates of the devices 220-238. To continue with the example illustrated in FIG. 7, the update rates of the meters may be configured as follows:

| Instrument | Update Rate |
| --- | --- |
| pH Meter 230 | 1 second |
| Dissolved Oxygen Meter 234 | 4 seconds |
| Reactor Temperature Meter 236 | 16 seconds |
| Reactor Level Meter 238 | 4 seconds |

To reduce latency and optimize resource allocation, the master network schedule 69 of the wireless network 204 may include superframes defined according to the update rates listed above. Preferably, an operator using a configuration software or the network manager 27 configures the optimal timeslot duration. In most commercial and industrial application, a 10 millisecond timeslot may have both a sufficient data capacity and a sufficiently short duration to ensure efficient interleave. However, timeslot durations greater than or less than 10 milliseconds may be used. Referring again to the table above and assuming that the amount of data reported during a single update session of a particular device does not exceed the capacity of a timeslot, a first superframe of the wireless network 204 may have a length of 160 timeslots. As discussed above, a timeslot with the same relative slot number will repeat after the other 159 timeslots scheduled in this superframe. This 160-slot superframe may be defined specifically for the reactor level meter 235. Of course, the timeslots associated with this superframe may be also allocated to other devices. However, the network manager 27 may first apply the 160-slot frame to accommodate the transmission needs of the meter 235. By means of analogous calculations, a 10-slot superframe may be defined for the pH meter 230 and two 40-slot superframes may be defined for the meters 234 and 237. Generally speaking, the superframes in this example will be defined in view of the update rates of the network devices 230-238, so that each of the devices 230-238 may send a measurement update during each cycle of a corresponding superframe. If desired, however, other manners of establishing superframe lengths may be used. For example, a superframe length may be based on the execution cycle or update rate of a control loop within a process plant, so that a controller connected within the wireless network may send out a control signal once every superframe cycle of a superframe.

Referring generally to the example wireless networks 14 and 204 illustrated in FIGS. 1 and 7, respectively, a network device may occasionally require additional bandwidth to accommodate a data burst, report an abnormal condition, etc. In addition to the predictable update rates of the network devices 25, 35-50, as well as the devices 220-239, the corresponding wireless network may experience changes in the network conditions requiring temporary or permanent reallocation of wireless resources. For example, the network device 32 may encounter an abnormal condition and may need to report data to the centralized controller in an amount exceeding the normal timeslot allocation to the device 32. In this case, the network device 32 may use a shared timeslot in a manner described above in reference to FIG. 3 and, upon securing the timeslot, initiate a request to the network manager 27 requesting a temporary increase in bandwidth. In response to receiving the request from the network device 32, the network manager 27 may define a new superframe, associate the individual timeslots within the new superframe with the communication channel identifiers such as frequency offset numbers, and update the network schedule 67. Alternatively, the network manager 27 may update the network schedule 67 by first identifying the available timeslot and channel resources associated with the existing superframes and then reserving these previously unassigned resources for the exclusive use by the network device 32. In some embodiments, the network manager 27 may also temporarily deactivate the superframe associated with the regular schedule of the network device 32. The network manager 27 may then assign a new superframe to the network device 32 for the expected period of time during which the network device 32 requires a different-than-normal bandwidth. Upon expiration of this temporary condition, the network manager 27 may reactive the "regular" superframe of the network device 32 and update the network schedule 67 again. Additionally, the network manager 27 may update the individual device schedule 69 of at least the network device 32. Of course, the network manager 27 may also update the device schedules 69 of other relevant network devices, such as those participating in routing data between the network device 32 and other network devices.

The scheduling techniques discussed above also allow devices with low update rates to conserve power by not participating in the non-essential network communications. For example, a certain network device may report measurements only once an hour. Further, this device may not participate in other network activities such as routing data on behalf of other devices. In this sense, this device may be considered transient with respect to the wireless network. In the intervals between transmissions, a transient device should preferably remain in a sleep mode, especially if the transient device operates using a battery. However, the existing wireless protocols either require each device to periodically transmit keep-alive messages or, if a certain device leaves the network for a long time, this device may need to go through a long and overhead expensive procedure of joining the network. Using the superframe scheduling concepts described herein, however, the network manager 27 supporting the techniques discussed herein may define a long superframe tailored to the transmission need of the transient device so that the transient device may efficiently re-join the network upon waking up without going through join procedures. That is, a very long superframe may be scheduled for the device, so that the device transmits and or receives during one or more initial time slots in each of the frame cycles of the long superframe. The device then goes into sleep mode during most of the rest of the time slots of the frame cycles of the long superframe. The device may wake back up before the end of each of the frame cycles of the superframe, sync its clock if needed based on network traffic, and be ready to transmit/receive again by the beginning of the next frame cycle of the superframe. In this manner, the device can effectively leave the network and enter sleep mode without the other devices in the network even knowing about it.

Referring to FIG. 8, the network manager 27 or another device or software entity may execute an exemplary procedure 300 as part of defining and maintaining the network schedule 67. In a block 302, the procedure 300 may obtain a timeslot definition. In one contemplated embodiment, an operator may specify the duration of a single timeslot in view of the particular requirements of a corresponding wireless network 14. In this case, each network device 25 and 35-50 must also be provisioned with the same value indicative of timeslot duration. Alternatively, the procedure 300 obtains the timeslot duration from a permanent memory of the gateway device 22. In accordance with this embodiment, the timeslot duration is a constant value provided as part of the definition of the WirelessHART protocol 70. For example, the timeslot duration may be permanently fixed at 10 milliseconds.

In a block 304, the network manager 27 may define a management superframe. In particular, the network manager 27 may schedule one or more timeslots in which the network manager 27 may periodically broadcast management information, such as a status of the wireless network 14. Additionally, the network devices 25 and 35-50 may use timeslots in the management superframe to transmit advertisement information, receive join requests from candidate network devices attempting to join the wireless network 14, and transmit join responses to the candidate network devices. In one embodiment, the network manager 27 sets the length of the management superframe in view of a longest update rate associated with the network 14. For example, the network manager 27 may set the length of the management superframe at 5 minutes if the "slowest" network device has an update rate of 5 minutes.

Referring again to FIG. 8, the procedure 300 may assess the update rates of each of the network devices 25 and 35-50 (block 304) and define superframes in accordance with these update rates (block 306). Next, in a block 310, the procedure 300 may associate individual communication channels with particular timeslots of each superframe defined in the block 308. For example, the network manager 27 may be configured to work with a frequency band including three carrier frequencies. The procedure 300 may accordingly associate individual timeslots with one of these three available frequencies.

Next, the procedure 300 may designate shared timeslots (block 312) within the management superframe. For example, the timeslots allocated for join requests are shared by definition because the network manager 27 can only know the receiver of a join request. Additionally, the network manager 27 may designate certain shared timeslots for the requests arriving at the network manager 27 from one of the existing network devices 25 and 35-50. These devices may use these shared timeslots to report unexpected conditions or to propagate unscheduled events to the network manager 27 (block 314). Some examples of these unscheduled requests include additional bandwidth allocation requests (block 316), forwarded join requests from the candidate network devices (block 318), and requests to disable superframes (320).

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of scheduling communications in a multi-node wireless mesh network including a first network device and a second network device, the method comprising:
    defining a communication timeslot of a predetermined duration;
    defining, by a centralized network manager, a first superframe including a first number of the communication timeslots including respective transmit segments;
    defining, by the centralized network manager, a second superframe including a second number of the communication timeslots including respective transmit segments;
    aligning the first superframe with the second superframe, so that one of the timeslots of the first superframe begins simultaneously with one of the timeslots of the second superframe; and
    associating, by the centralized network manager, the first and the second superframes with a network schedule for the multi-node wireless mesh network, the multi-node wireless mesh network operating in conjunction with a process plant,
    wherein:
        at least one of the first network device or the second network device performs a physical control function included in a control loop corresponding to a process being controlled by the process plant,
        the first network device and the second network device each transmit data according to the network schedule, and
        the data transmitted by the at least one of the first network device or the second network device is used to control the process.

2. The method of claim 1, wherein the first number of communication timeslots is not equal to the second number of communication timeslots.

3. The method of claim 2, wherein the first number corresponds to a transmission rate of the first network device and the second number of timeslots corresponds to a transmission rate of the second network device.

4. The method of claim 3, wherein the first superframe includes a repeating sequence of cycles, each cycle including the first number of consecutively scheduled communication slots, wherein the first network device transmits data in one of the timeslots of the first superframe during each cycle of the first superframe.

5. The method of claim 1, wherein the first network device receives data during at least one timeslot of the second superframe, and wherein the second network device transmits data during at least one timeslot of the second superframe.

6. The method of claim 1, wherein at least one timeslot of the first superframe is associated with a first radio frequency and at least one other timeslot of the first superframe is associated with a second radio frequency different from the first radio frequency.

7. The method of claim 1, wherein the first network device and the second network device each perform one of a control or a measurement function in the process control environment.

8. The method of claim 1, wherein the first superframe is associated with the first network device and the second superframe is associated with a second network device, the method further comprising:
    defining a first individual device schedule for use by the first network device, wherein the first individual device schedule includes information related to the timeslots in the first superframe or the second superframe during which the first network device transmits or receives data;
    defining a second individual device schedule for use by the second network device, wherein the second individual device schedule includes information related to the timeslots of the first superframe or the second superframe during which the second network device transmits or receives data; and communicating the first individual device schedule to the first network device and second individual device schedule to the second network device.

9. A method of scheduling communications in a multi-node mesh network including a first network device and a second network device, the method comprising:
   defining a communication timeslot of a predetermined duration;
   defining, by a centralized network manager, a first superframe including a first number of the communication timeslots including respective transmit segments, wherein the first number corresponds to a transmission rate of the first network device;
   defining, by the centralized network manager, a second superframe including a second number of the communication timeslots including respective transmit segments, wherein the second number of timeslots corresponds to a transmission rate of the second network device, and wherein the second number of communication timeslots is not equal to the first number of communication timeslots;
   aligning the first superframe with the second superframe, so that one of the timeslots of the first superframe begins simultaneously with one of the timeslots of the second superframe; and
   associating, by the centralized network manager, the first and the second superframes with a master network schedule for the multi-node mesh network, wherein:
      the multi-node mesh network operates in conjunction with a process control environment,
      at least one of the first network device or the second network device performs a physical control function corresponding to a process being controlled by the process control environment,
      the first network device transmits data in at least one timeslot of the first superframe and during at least one timeslot of the second superframe according to the master network schedule, and
      the data is used in a control scheme to control the process.

10. The method of claim 9, wherein the multi-node mesh network is a wireless process control network, wherein the communication timeslot is a Time Division Multiple Access (TDMA) timeslot, the method further comprising:
   allocating a plurality of radio channels, wherein each radio channel is associated with a unique radio frequency;
   associating one of the timeslots of the first superframe with a first of the plurality of radio channels; and
   associating another one of the timeslots of the first superframe with a second of the plurality of radio channels.

11. The method of claim 9, wherein defining a communication timeslot of a predetermined duration includes:
   allocating a first segment of the timeslot for assessing availability of the communication timeslot;
   allocating a second segment of the communication timeslot for a transmitting a data packet; and
   allocating a third segment of the communication timeslot for transmitting an acknowledgement associated with the data packet; wherein none of the first, second, or third segment overlaps another one of the first, second, or third segment.

12. The method of claim 11, wherein defining a communication timeslot of a predetermined duration further includes:
   defining a dedicated communication timeslot, wherein no more than one source network device transmits data during the dedicated communication timeslot; and
   defining a shared communication timeslot, wherein a plurality of source network devices transmit data during the shared communication timeslot;
   wherein each of the first and second superframes includes at least one shared communication timeslot and at least one dedicated communication timeslot.

13. The method of claim 9, further comprising:
   receiving a bandwidth increase request from the first network device, wherein the first network device sends a bandwidth increase request in response to detecting a temporary increase in the transmission rate of the first network device;
   defining a third superframe in response to receiving the bandwidth increase request from the first network device, wherein the third superframe is associated with the temporary increase in the transmission rate of the first network device;
   temporarily adding the third superframe to the master network schedule without restarting the multi-node mesh network, wherein the first network device transmits data during at least one timeslot of the third superframe according to the master network schedule.

14. The method of claim 13, further comprising:
   deactivating the third superframe in response to detecting a deactivation command from the first network device, whereby each network device participating in the third superframe stops transmitting or receiving data in each of the timeslots of the third superframe.

15. The method of claim 13, further comprising:
   deleting the third superframe from the master network schedule in response to detecting a delete command from the first network device.

16. The method of claim 9, further comprising:
   defining a management superframe for transmitting management information related to the multi-node mesh network, wherein the management information is transmitted to the first and the second network devices during only one of the timeslots of the management superframe, and wherein the management information is transmitted from a network manager device servicing the multi-node mesh network.

17. The method of claim 9, wherein the second network device is a transient device having a low update rate relative to other network devices, wherein the second network device does not route data traveling to or from other network devices, the method further comprising:
   maintaining the second network device in a sleep mode during most of a period in which the second network device is not communicating in the second superframe; and
   restoring communication between the second network device and the multi-node mesh network without transmitting additional commands by waking up the second network device prior to an occurrence of a timeslot of the second superframe during which the second network device is scheduled to communicate.

18. The method of claim 9, wherein maintaining the second network device in a sleep mode includes not receiving keep-alive messages during the period in which the second network device is not communicating in the second superframe.

19. The method of claim 9, further comprising:
   defining a first individual device schedule for use by the first network device, wherein the first individual device schedule includes only information related to the timeslots of the first superframe or the second superframe during which the first network device transmits or receives data;

defining a second individual device schedule for use by the second network device, wherein the second individual device schedule includes only information related to the timeslots of the first superframe or the second superframe during which the second network device transmits or receives data; and communicating the first individual device schedule to the first network device and second individual device schedule to the second network device.

20. The method of claim 9, further comprising allocating a plurality of radio channels, wherein each radio channel is associated with a unique radio frequency;

associating a first timeslot of the first superframe with at least two of the plurality of radio channels, wherein the first timeslot of the first superframe occurs on a first of the at least two of the plurality of radio channels during a first frame cycle of the first superframe and wherein the first timeslot of the first superframe occurs on a second of the at least two of the plurality of radio channels during a second frame cycle of the first superframe.

21. A multi-node mesh wireless network including a plurality of network devices and operating in a process control environment, the network comprising:

a first network device;

a second network device corresponding to a physical control function included in a control loop corresponding to a process being controlled by the process control environment;

a plurality of wireless connections between pairs of the plurality of network devices, including a first wireless connection between the first network device and the second network device; and a network manager storing a network schedule for use by the first network device and the second network device, the network schedule including:

a first superframe including a first number of timeslots of a predefined duration including respective transmit segments, the first number of timeslots cyclically repeating to define a first plurality of frame cycles; and a second superframe including a second number of timeslots of a predefined duration including respective transmit segments, the second number of timeslots cyclically repeating to define a second plurality of frame cycles, wherein the first network device and the second network device are each assigned at least one respective timeslot in which to transmit respective data used to control the process.

22. The network of claim 21, wherein the first network device is associated with a first update rate and the second network device is associated with a second update rate and wherein the first number of timeslots corresponds to the first update rate and the second number of timeslots corresponds to the second update rate; and wherein the first network device transmits data during at least one timeslot in each of the first plurality of frame cycles and the second network device transmits data during at least one timeslot in each of the second plurality of frame cycles.

23. The network of claim 21, wherein the first network device includes a first memory unit that stores a first fragment of the network schedule and the second network device includes a second memory unit that stores a second fragment of the network schedule different from the first fragment of the network schedule.

24. The network of claim 21, further including a plurality of wireless channels; wherein at least one timeslot in the first superframe is associated with a first one of the plurality of wireless channels and at least another one timeslot in the first superframe is associated with a second plurality of wireless channels.

25. A multi-node mesh wireless network adapted to dynamically schedule communications between a plurality of network devices, the network comprising:

a first network device corresponding to a physical control function corresponding to a process being controlled by a process control environment, and the first network device associated with a first update rate corresponding to a frequency of transmitting, from the first network device, process data used in a control scheme for the process;

a second network device associated with a second update rate corresponding to a frequency of transmitting data from the second network device;

a plurality of wireless connections between pairs of the plurality of network devices, including a wireless connection between the first network device and the second network device; and a network manager responsible for defining and scheduling communication resources in the multi-node mesh network, the communication resources including:

a plurality of communication channels;

a first superframe including a first number of timeslots of a fixed predefined duration including respective transmit segments, wherein the first number of timeslots corresponds to the first update rate; and a second superframe including a second number of timeslots of a fixed predefined duration including respective transmit segments, wherein the second number of timeslots corresponds to the second update rate; wherein the network manager associates at least one of the first number of timeslots with a first one of the plurality of communication channels and at least another one of the first number of timeslots with a second one of the plurality of communication channels.

26. A computing device in communicative connection with a wireless mesh network including a plurality of network devices, the computing device embodied with a network manager software routine comprising computer-executable instructions including:

a first procedure to define a plurality of concurrent overlapping superframes, wherein each of the superframes includes repeating superframe cycles defined by a fixed number of communication timeslots of a fixed time duration and including respective transmit segments, and wherein the superframe cycle for at least one of the plurality of concurrent overlapping superframes includes a different number of communication timeslots than the superframe cycle for another one of the concurrent overlapping superframes, and wherein each of the plurality of concurrent overlapping superframes is associated with one or more of the plurality of network devices;

a second procedure to define a management superframe for shared use by the plurality of network devices; and a third procedure to define a plurality of device specific schedules, wherein:

each of the plurality of device specific schedules is associated with one of the plurality of network devices, each of the plurality of device specific schedules specifies at least one timeslot during which the network device is allowed to transmit data and at least one timeslot during which the network device is allowed to receive data, none of the network devices transmits or receives data in a communication timeslot not included in the device specific schedule of the network device, at least one of the plurality of network devices performs a physical control function included in a control loop corresponding to a process being controlled within a process control network, and the data transmitted by the at least one of the plurality of network devices is used to control the process.

27. A method of scheduling communications in a multi-node mesh network including a first network device and a second network device, the method comprising:

defining a communication timeslot of a predetermined duration;

defining, by a centralized network manager, a first superframe having a first repeating superframe cycle including a first number of the communication timeslots including respective transmit segments, wherein the first number corresponds to a transmission rate of the first network device and wherein the first network device transmits first process data associated with the first network device during at least one of the communication timeslots of the first superframe, the first process data used to control a process being controlled by a process control environment corresponding to the multi-node mesh network;

defining, by the centralized network manager, a second superframe having a second repeating superframe cycle including a second number of the communication timeslots including respective transmit segments, wherein the second number of timeslots corresponds to a transmission rate of the second network device, wherein the second network device transmits second process data associated with the second network device during at least one of the communication timeslots of the second superframe, the second process data used to control the process, and wherein the first network device does not transmit the first process data associated with the first network device using any of the timeslots of the second superframe;

defining, by the centralized network manager, a management superframe including a third number of the communication timeslots, wherein none of the first network device or the second network device transmits, respectively, the first process data or the second process data using any of the communication timeslots of the management superframe and wherein at least one of the communication timeslots of the management superframe is reserved for network management data; and aligning the first superframe, the second superframe, and the management superframe so that one of the timeslots of the first superframe begins simultaneously with one of the timeslots of the second superframe and with one of the timeslots of the management superframe, wherein at least one of the first network device or the second network device corresponds to a physical control function corresponding to the process.

\* \* \* \* \*